(12) United States Patent
Brook et al.

(10) Patent No.: US 8,746,618 B2
(45) Date of Patent: Jun. 10, 2014

(54) COMPOSITE STRINGER WITH WEB TRANSITION

(75) Inventors: Kenneth L. Brook, Seattle, WA (US); Niraj Patel, Seattle, WA (US); John D. Morris, Seattle, WA (US); Michael A. Lee, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/284,927

(22) Filed: Oct. 30, 2011

(65) Prior Publication Data
US 2012/0045609 A1 Feb. 23, 2012

Related U.S. Application Data

(62) Division of application No. 12/474,005, filed on May 28, 2009, now Pat. No. 8,074,694.

(51) Int. Cl.
*B64C 1/00* (2006.01)
(52) U.S. Cl.
USPC .......................................................... 244/119
(58) Field of Classification Search
USPC ........... 156/243; 428/120, 174, 178; 244/119, 244/123.1, 132
See application file for complete search history.

(56) References Cited

U.S. PATENT DOCUMENTS

| | | | |
|---|---|---|---|
| 5,451,015 A * | 9/1995 | Cronkhite et al. | 244/135 R |
| 7,798,285 B2 * | 9/2010 | Chiou et al. | 181/213 |
| 7,806,367 B2 * | 10/2010 | Munoz Lopez et al. | 244/123.7 |
| 7,837,147 B2 * | 11/2010 | Liguore et al. | 244/119 |
| 8,042,768 B2 * | 10/2011 | Liguore et al. | 244/119 |
| 8,043,554 B2 * | 10/2011 | Yip et al. | 264/573 |
| 8,074,694 B2 * | 12/2011 | Brook et al. | 156/523 |
| 8,262,969 B2 * | 9/2012 | Wade et al. | 264/257 |
| 8,297,555 B2 * | 10/2012 | Liguore et al. | 244/119 |
| 8,528,862 B2 * | 9/2013 | Liguore et al. | 244/119 |
| 2006/0108057 A1 * | 5/2006 | Pham et al. | 156/245 |
| 2006/0208135 A1 * | 9/2006 | Liguore et al. | 244/117 R |
| 2008/0029644 A1 * | 2/2008 | Martinez Cerezo et al. | 244/119 |
| 2008/0268208 A1 * | 10/2008 | Martin et al. | 428/174 |
| 2008/0290214 A1 | 11/2008 | Guzman et al. | |
| 2008/0302912 A1 | 12/2008 | Yip et al. | |
| 2008/0302915 A1 | 12/2008 | Yip et al. | |
| 2010/0320319 A1 * | 12/2010 | Liguore et al. | 244/119 |

* cited by examiner

*Primary Examiner* — Philip J Bonzell

(57) ABSTRACT

A stringer comprises a base portion and first and second webs extending outwardly from the base portion. The orientation of at least one of the first and second webs may transition from a first angle to a second angle within an angle transition zone.

17 Claims, 27 Drawing Sheets

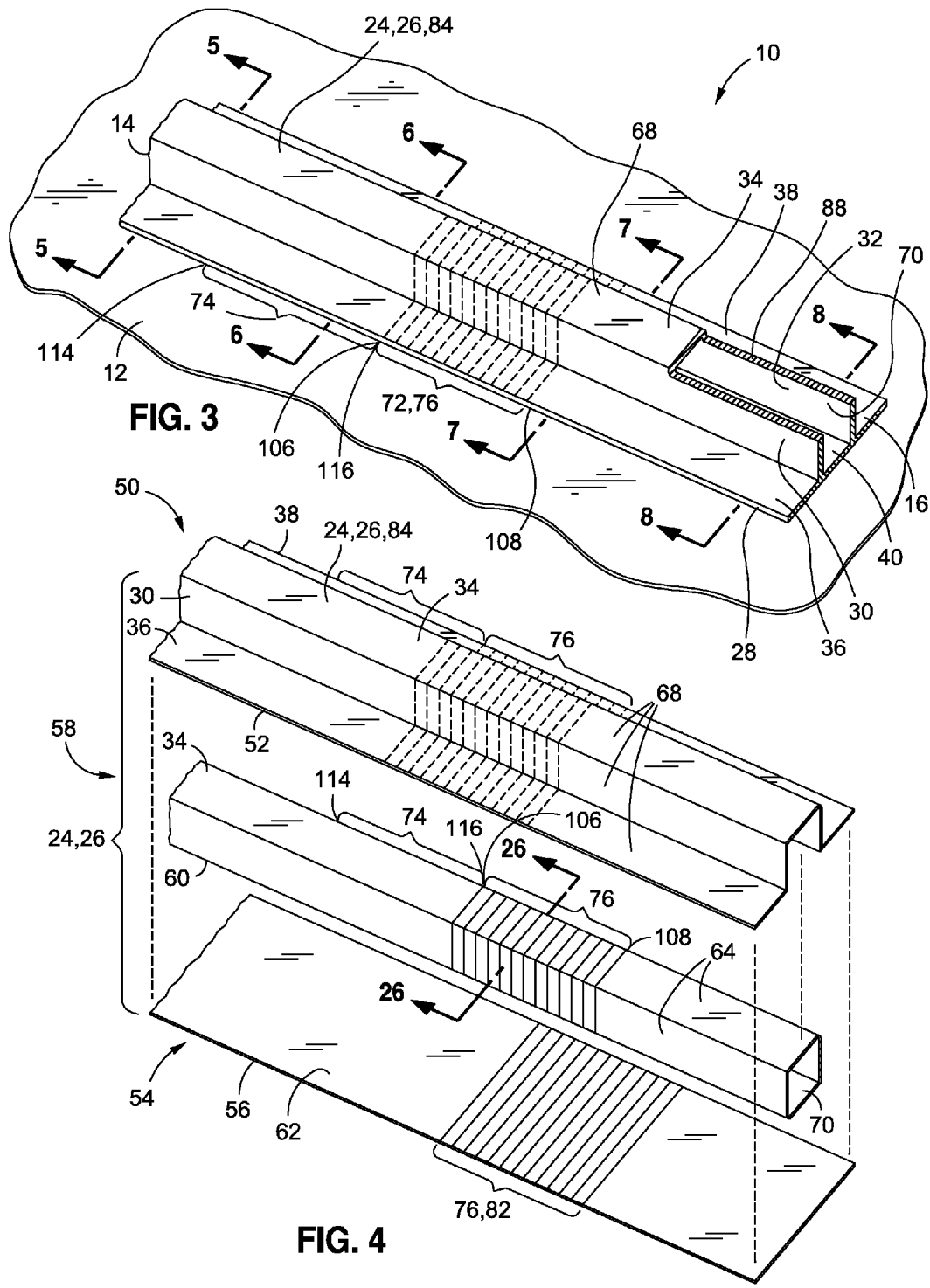

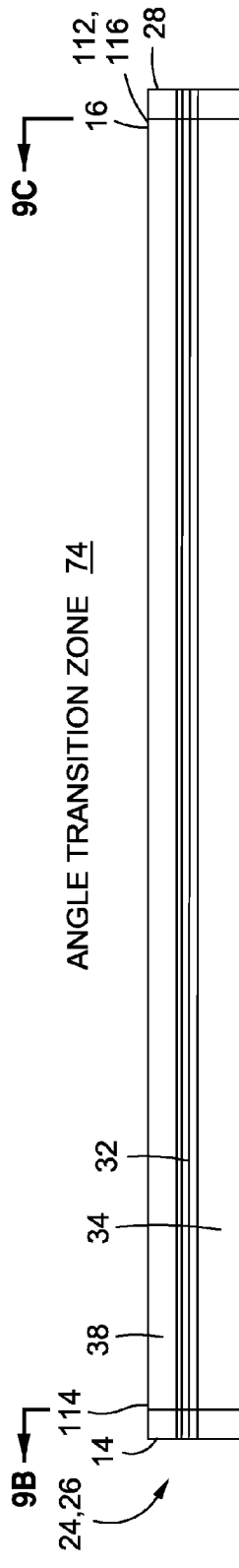
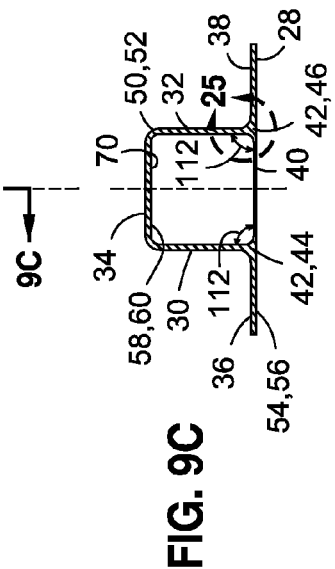
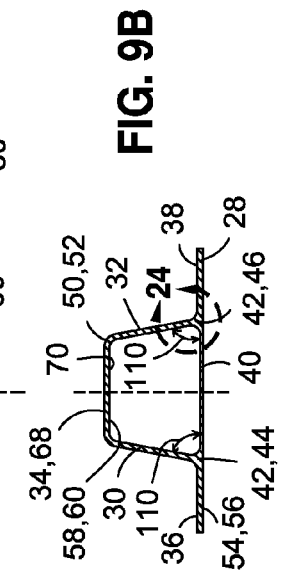
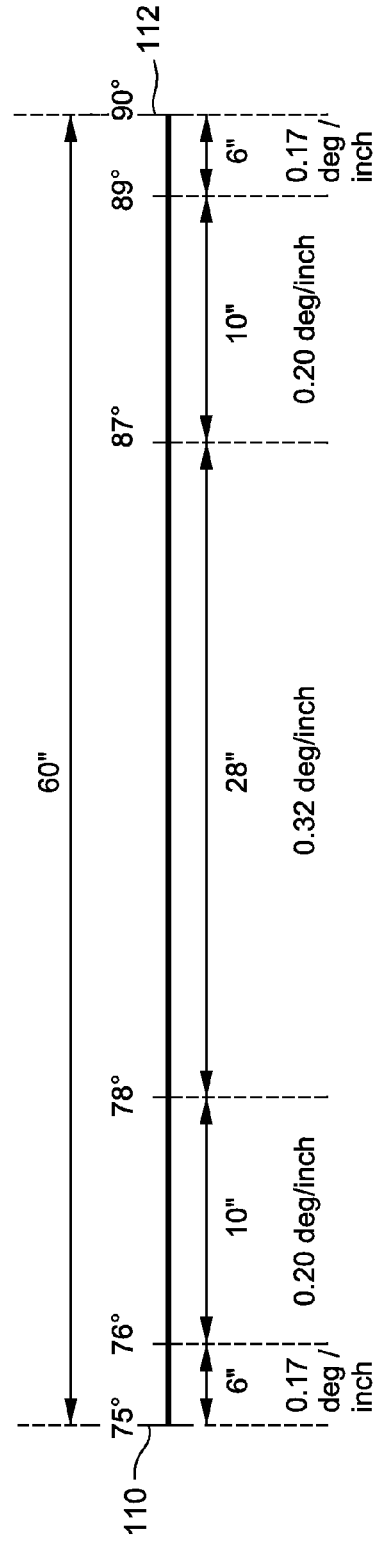
FIG. 9A
FIG. 9B
FIG. 9C
FIG. 9D

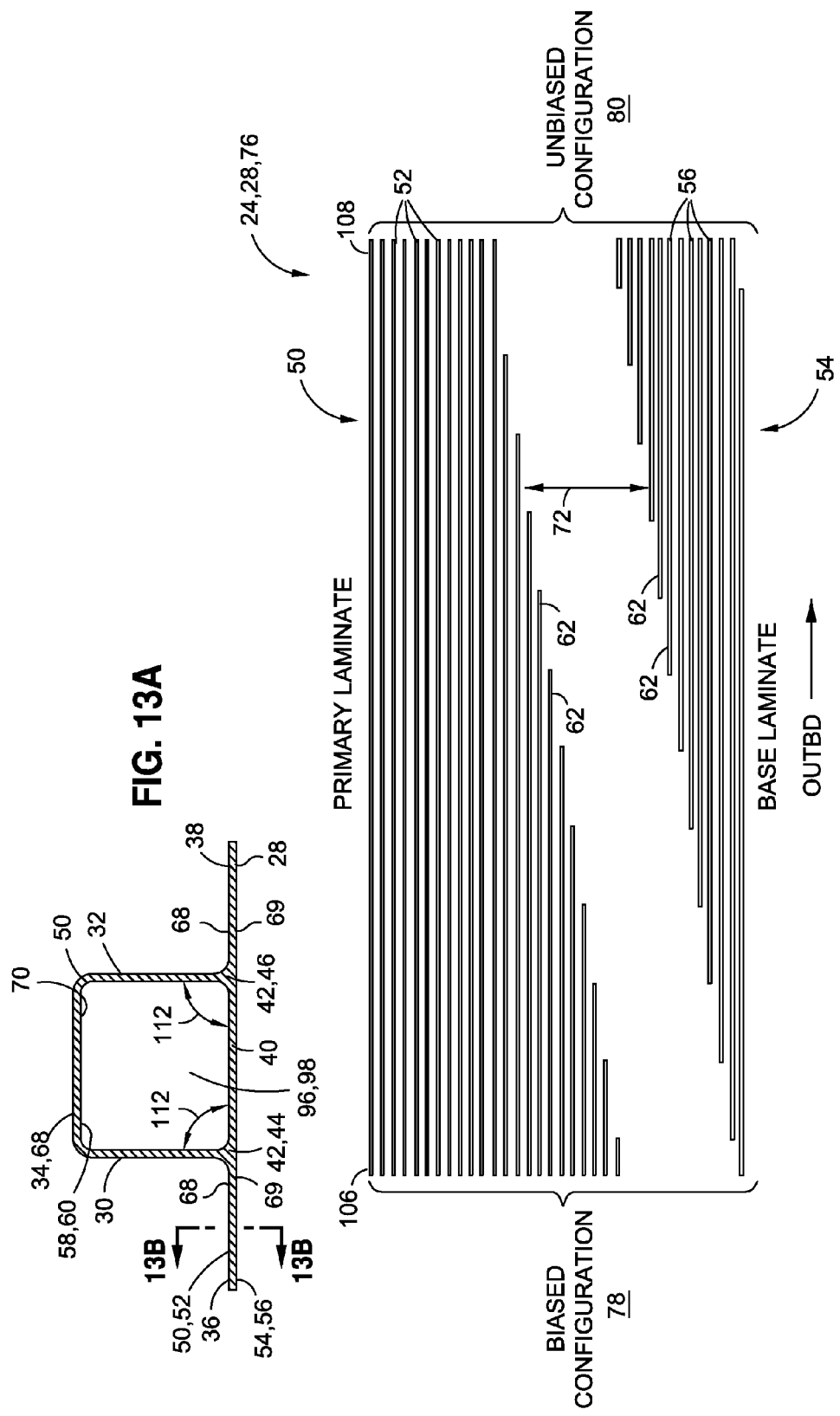

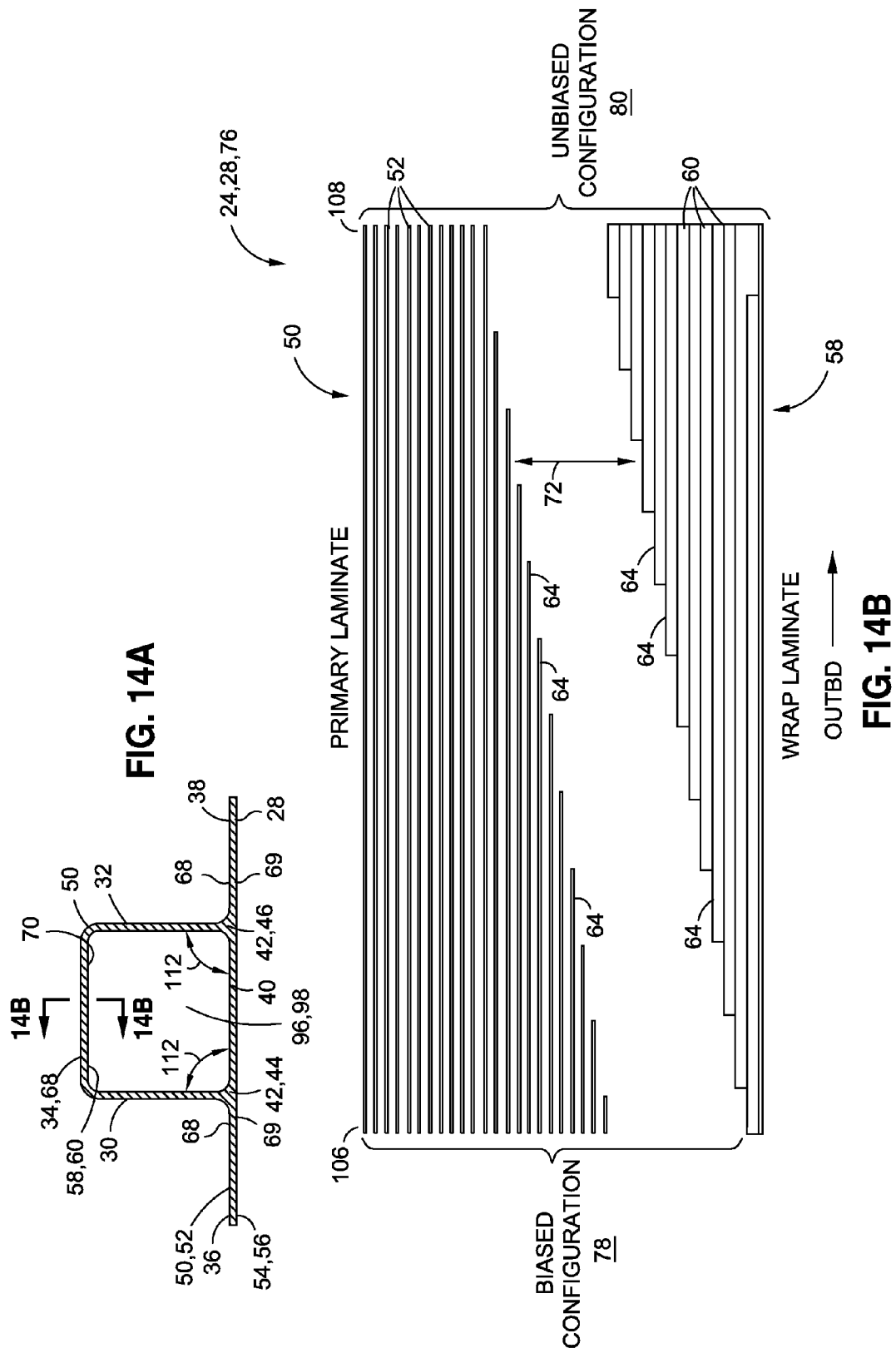

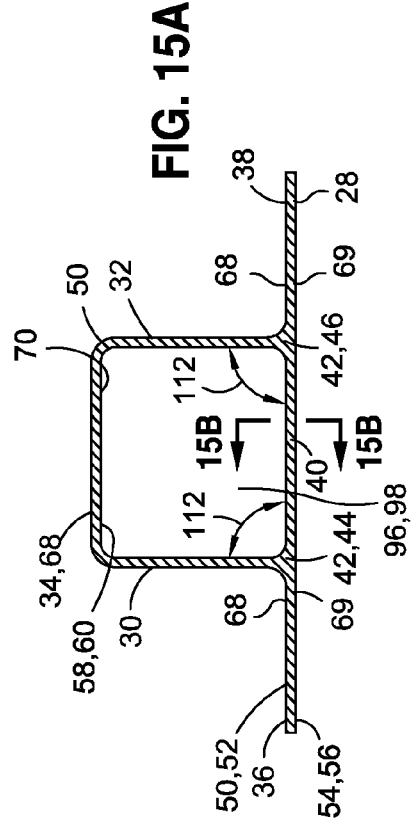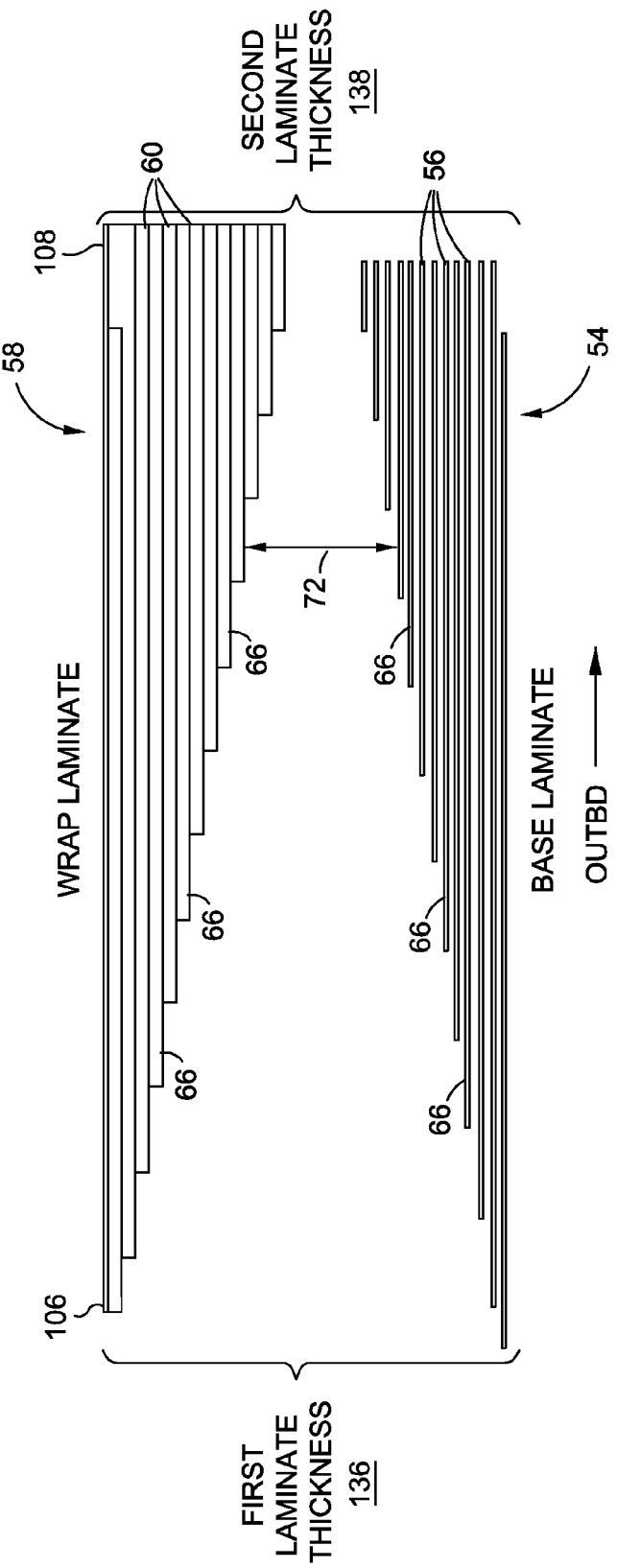

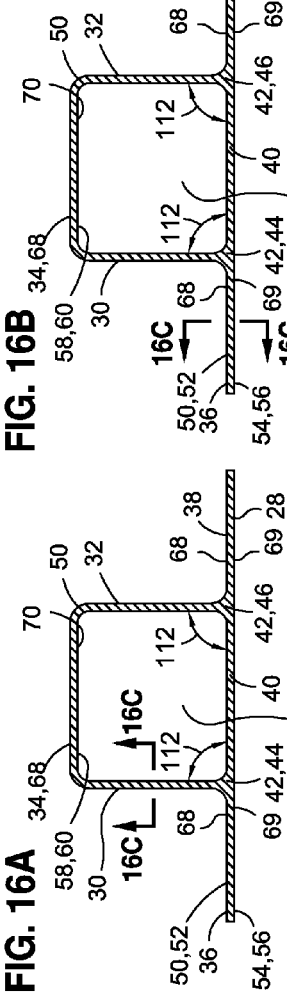
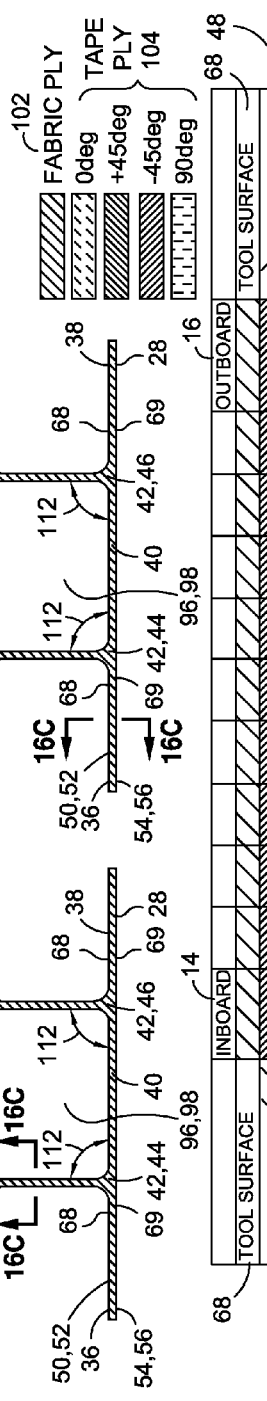
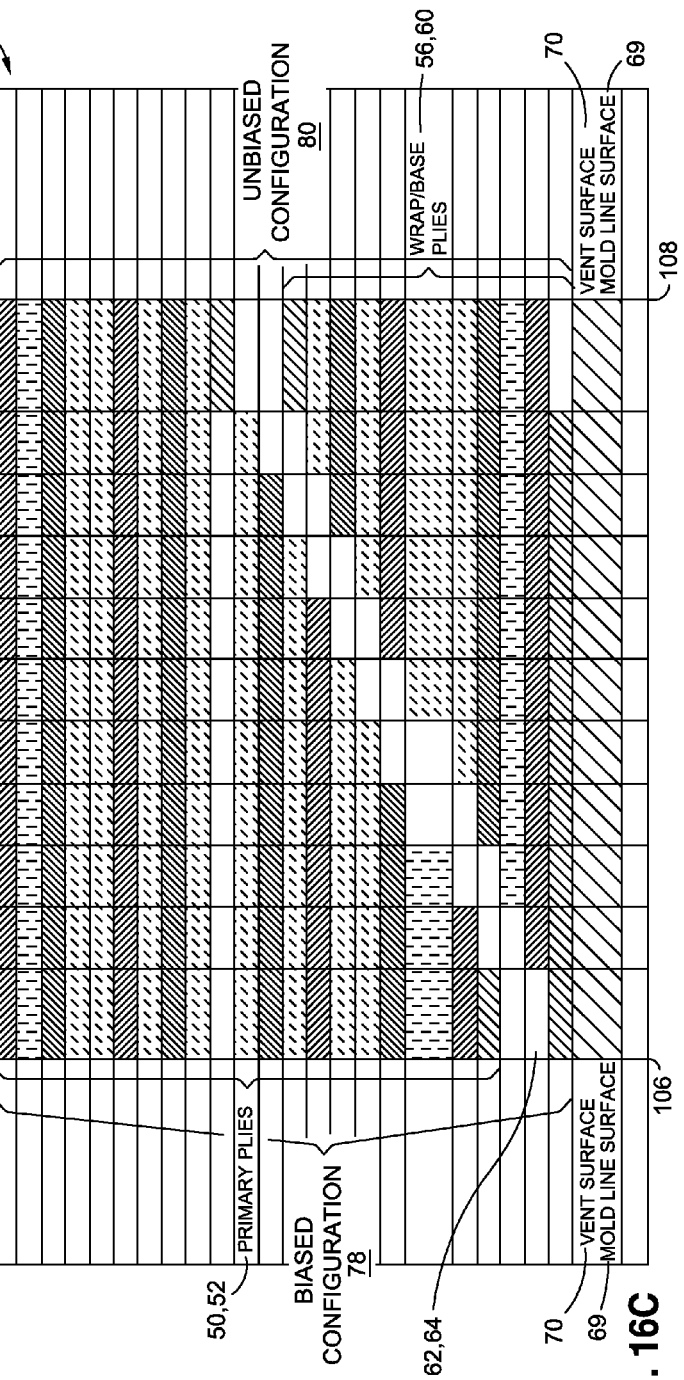
FIG. 16A
FIG. 16B
FIG. 16C

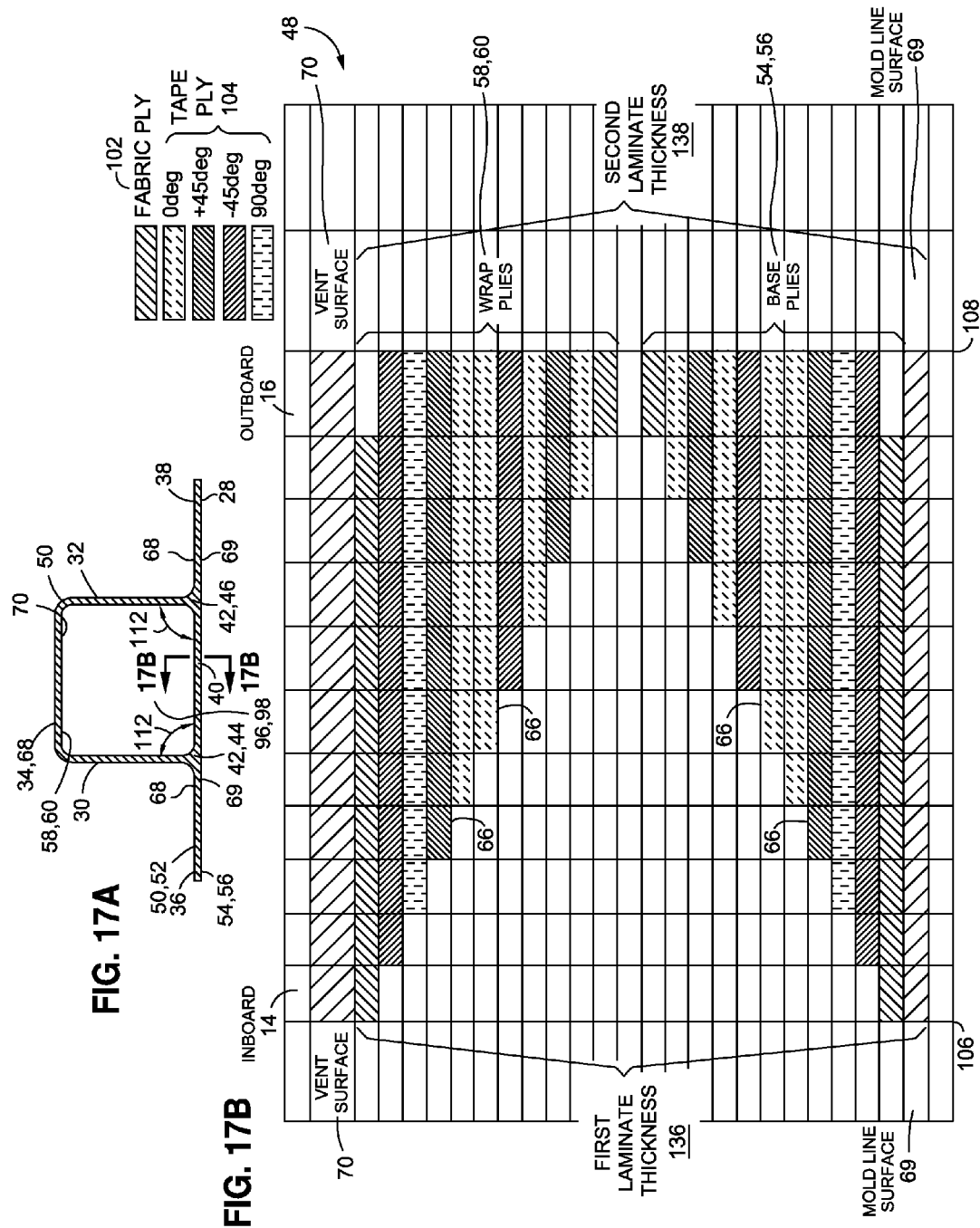

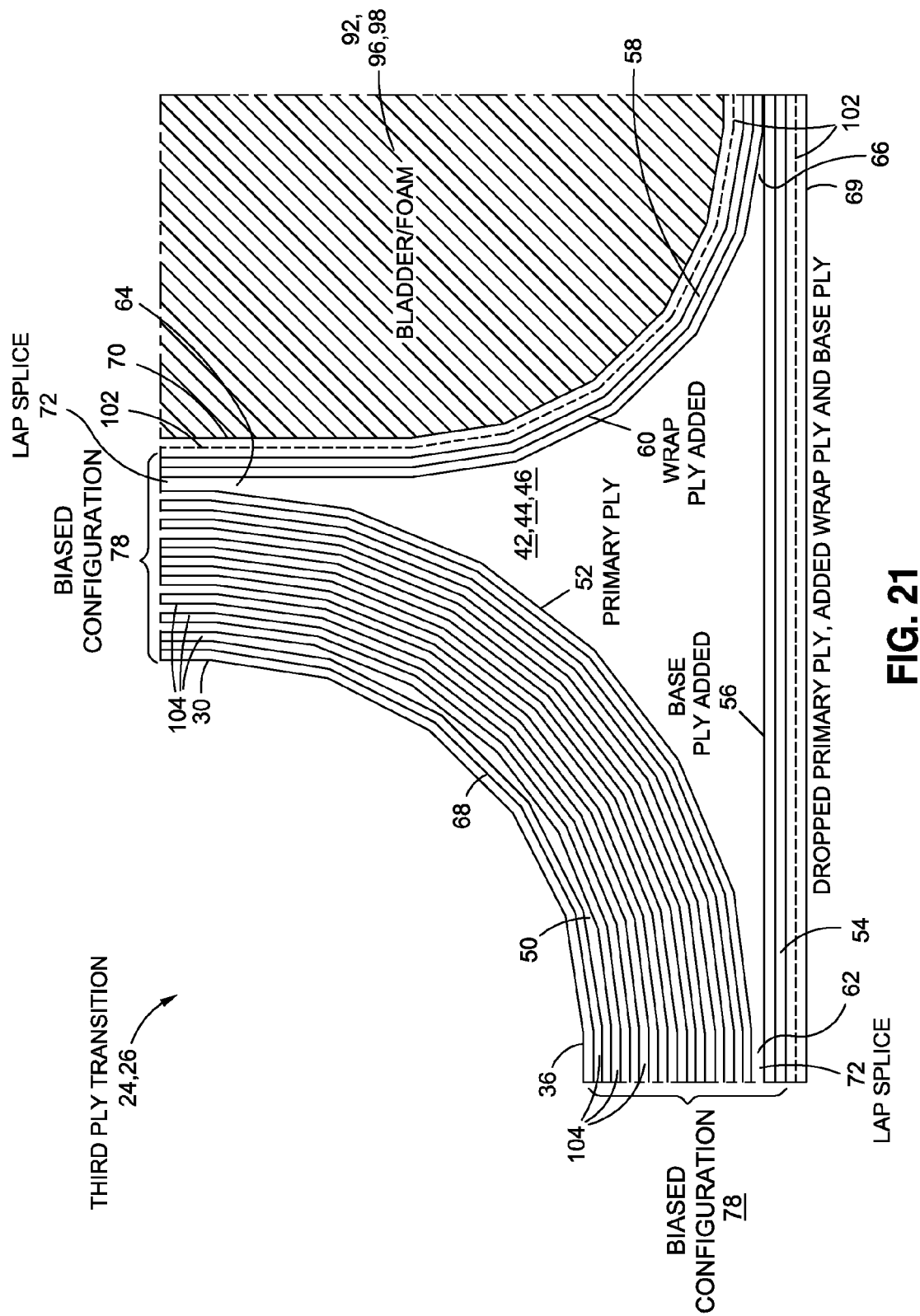

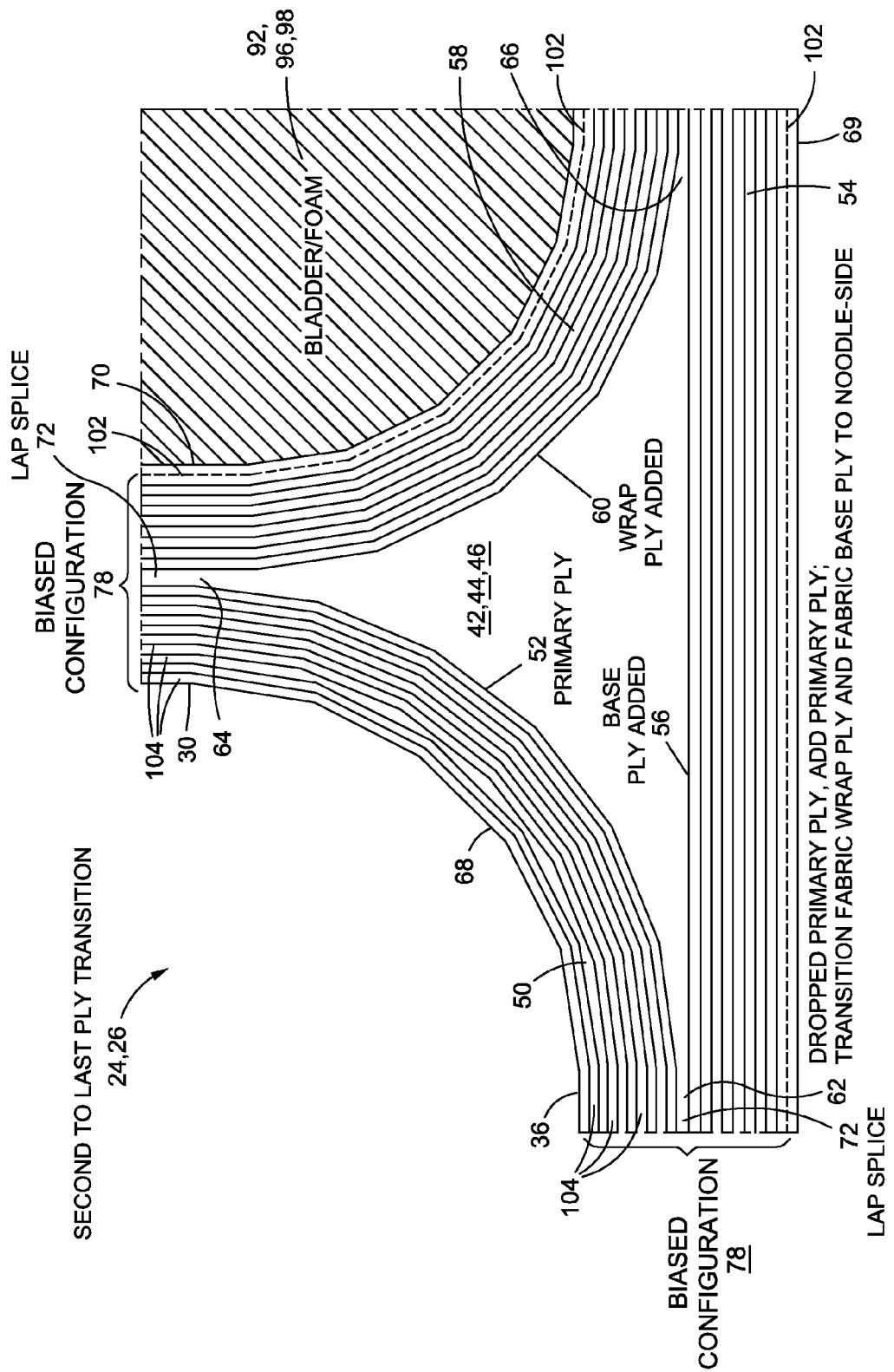

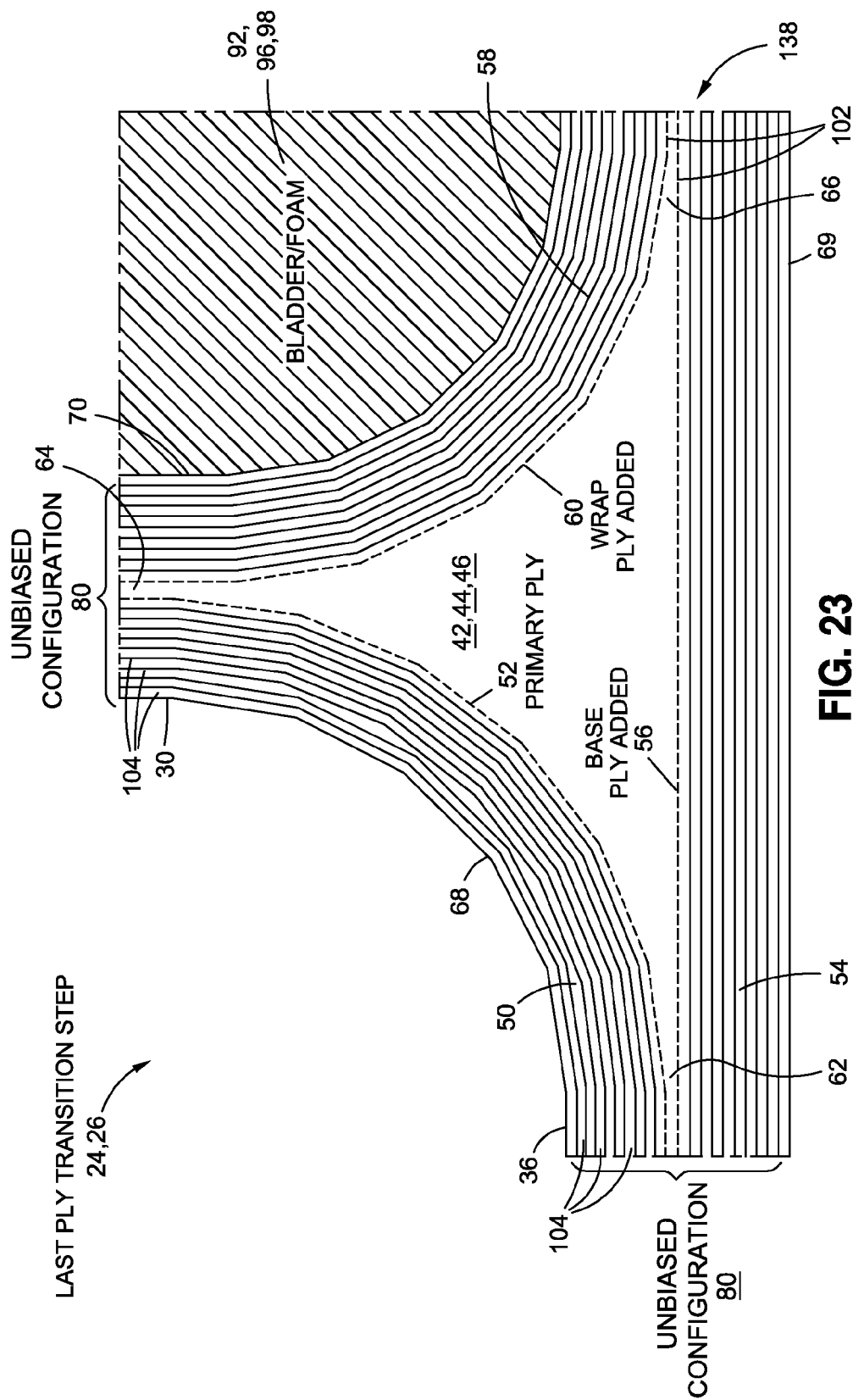

COMPOSITE STRINGER WITH WEB TRANSITION

CROSS-REFERENCE TO RELATED APPLICATIONS

This application is a divisional application of and claims priority to pending U.S. application Ser. No. 12/474,005 filed on May 28, 2009 and entitled STRINGER TRANSITION METHOD, the entire contents of which is expressly incorporated by reference herein.

FIELD

The present disclosure relates generally to the production of composite parts and, more particularly, to a stringer configuration and method as used in forming composite laminates.

BACKGROUND

Composite structures are used in a wide variety of applications. In aircraft construction, composites are used in increasing quantities to form the fuselage, wings, tail section and other components. For example, the wings may be constructed of composite skin members to which stiffening elements such as stringers may be coupled to increase the bending strength and stiffness of the skin member. The stringers may extend in a generally spanwise direction along the wing. The stringers may be bonded to the skin members and may be configured to carry bending loads or loads that are oriented substantially perpendicularly relative to the skin member.

Stringers may be provided in a wide variety of cross-sectional shapes. For example, a stringer cross section may comprise a plurality of composite plies formed in a hat-section configuration having a base portion and a pair of webs extending outwardly from the base portion. The base portion may comprise a pair of flanges to facilitate coupling (e.g., bonding) of the stringer to the skin member such as the upper and lower wings skins of a wing. The hat-section stringer may include a cap which interconnects the webs and encloses the hat section in order to increase the torsional rigidity of the stringer. The cap also provides lateral stability to the webs against lateral bending or folding of the webs. At an intersection of each one of the flanges with one of the webs, a radius filler or noodle may be installed to enhance the load-carrying capabilities of the stringer.

The stringers in a wing may extend from an inboard section of the wing to an outboard section of the wing. Different loading conditions may be imposed on the wing at different locations along the wingspan. For example, at an inboard section of the wing, bending loads are typically higher than bending loads at an outboard section of the wing. In order to optimize the load carrying efficiency of the stringers and to minimize the occurrence of localized stresses in the skin members to which the stringers are coupled, it is typically desirable to reduce the stiffness of the stringer at the outboard section of the wing where the stringer may terminate. One method of reducing the stiffness of the stringer is to remove a portion of the cap. Removal of the cap from the stringer may also provide an opening in the stringer through which fuel vapors may be vented. In this regard, the stringer may provide secondary utility in addition to the primary load carrying function by acting as a conduit for venting fuel vapors from the inboard section of the wing near the fuel tanks to the outboard section of the wings.

However, for stringer cross sections where the web is oriented non-perpendicularly relative to the base portion, removal of the cap may necessitate a mechanism for maintaining the stability of the webs to prevent unwanted lateral bending. For example, the hat section of the stringer may comprise a cross-section having a trapezoidal configuration wherein each of the webs is angled inwardly toward one another and being interconnected by the cap. At locations where the cap is intact, the cap stabilizes the webs against such lateral bending or folding. However, at locations where the cap has been removed, the inwardly-angled webs are unsupported such that bending loads in the stringer may induce the webs to fold laterally inwardly.

Stabilizing the webs against lateral bending may also be necessary for stringers having a biased configuration in the ply layup. More specifically, when the stringer is viewed in cross section at the intersection of one of the webs with one of the flanges, the quantity of composite plies that make up the webs may be biased toward one side of the intersection or noodle. More specifically, when viewing a cross section of the composite plies that make up a thickness of the web, a larger quantity of plies may be positioned on one side of the intersection or noodle than on an opposite side of the noodle. The biased configuration may have undesired results.

Current techniques for stabilizing the webs include the use of metal (e.g., aluminum) fittings which may be mechanically fastened to the webs and flanges or skin members. Although generally satisfactory for their intended purpose, the use of such fittings presents certain drawbacks. For example, each one of the metal fittings must be individually fastened to the stringer using specialized mechanical fasteners which may require the formation of appropriately-sized holes in the fiber reinforced composite material which makes up the stringer and skin members. As opposed to conventional methods of forming holes in metallic structures, forming holes in composite materials and structures may also require the use of specialized tooling.

In addition, composites structures may require the installation of sleeved conductive fasteners. Such fasteners must typically be installed in a wet condition using a sealant to prevent galvanic corrosion between the dissimilar materials of the metallic fitting and the composite stringer/skin member. The wet installation of fasteners may further be required to prevent leakage across fasteners and/or to fill gaps between the fastener and the hole to allow for proper shear load transfer across the fastener and the hole. In addition, the use of metallic fittings may require the installation of sealant at the mating surfaces of the fitting and the stringer/skin member to prevent moisture buildup. Even further, in certain applications, fillet seals must be applied at the edges of the metallic fitting and the composite stringer to prevent moisture intrusion. As may be appreciated, the installation of metallic fittings in composite structures to stabilize the webs of a stringer may result in an increase in production time, increased part count, and an overall increase in the complexity of the structure.

As can be seen, there exists a need in the art for a system and method for stabilizing the webs of a stringer against lateral bending or folding which may otherwise occur as a result of a non-perpendicular orientation of the webs or due to a biased configuration in the composite plies that make up the stringer. Such stabilization may be required at locations where a cap of the stringer is not provided or which may occur at locations along the stringer where the cap has been removed. In this regard, there exists a need in the art for a system and method for stabilizing the webs of the stringer against lateral bending or folding which does not require the installation of separate metallic fittings.

SUMMARY

The above noted needs associated with composite stringers are specifically addressed by the present disclosure which provides a stringer having a base portion and first and second webs which extend outwardly from the base portion. The orientation of the first web may transition from a first angle to a second angle within an angle transition zone. Likewise, the orientation of the second web may transition from the first angle to the second angle within the angle transition zone.

In an embodiment, the stringer may be incorporated into a composite aircraft structure. The structure may include a skin member. The stringer may be mounted to the skin member. The stringer may define a cross section that may transition from a hat section to a dual-blade section. The first and second webs of the stringer may define an orientation relative to the base portion wherein the orientation may transition within an angle transition zone which may have opposing first and second angle zone ends. The first web may define a non-perpendicular orientation at the first angle zone end Likewise, the second web may define a non-perpendicular orientation at the first angle zone end.

The present disclosure further includes a method of transitioning the stringer from the hat section to the dual-blade section. The method may comprise the step of altering the orientation of the first web from the first angle to the second angle within the angle transition zone. The method may further comprise altering the orientation of the second web from the first angle to the second angle within the angle transition zone.

In an embodiment, the method may comprise forming a base laminate by laying up base plies on a base mold. The method may further include increasing a quantity of the base plies incrementally within the ply transition zone. In addition, the primary laminate may be formed by laying up primary plies on a cure mold having cure mold side walls. The cure mold side walls may transition from the first angle to the second angle within the angle transition zone. The method may further comprise decreasing the quantity of the primary plies incrementally within the ply transition zone in correspondence with the incremental increase in the base plies.

Furthermore, the method may comprise forming a wrap laminate by laying up wrap plies about a mandrel that may be formed complementary to the cure mold. The quantity of the wrap plies may be increased incrementally within the ply transition zone in correspondence with the incremental decrease in primary plies and the incremental increase in base plies. In addition, the method may comprise inserting the wrap laminate into the primary laminate and placing a first and/or second noodle along the wrap laminate and primary laminate.

The method may also include adding the base laminate to the wrap laminate and primary laminate. Following the addition of the base laminate to the wrap laminate and primary laminate, the method may comprise co-curing the base laminate, wrap laminate and primary laminate together to form the stringer. The method may comprise forming an opening in the stringer by removing at least a portion of a cap of the stinger.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 3 is a perspective illustration of one of the stringers of FIG. 2 and illustrating the stringer being fastened to a skin member and having a portion of a cap of the stringer being removed from the stringer;

FIG. 4 is an exploded perspective illustration of the stringer of FIG. 3 illustrating the interconnectivity of the base laminate, the wrap laminate and the primary laminate that make up the stringer;

FIG. 9A is a plan view of the stringer along an angle transition zone wherein at least one of the first and second webs transitions from the first angle to the second angle;

FIG. 9B is a cross-sectional illustration of the stringer taken at the first angle zone end of the angle transition zone wherein at least one of the first and second webs is oriented at the first angle;

FIG. 9C is a cross-sectional illustration of the stringer taken at the second angle zone end of the angle transition zone wherein at least one of the first and second webs is oriented at the second angle;

FIG. 9D is a schematic illustration of the angle transition zone where the orientation of the first and second webs may vary in transition rate;

FIG. 13A is a reference cross section of the stringer in the ply transition zone;

FIG. 13B is a schematic illustration of the ply layup of the first and second flanges taken along line 13B-13B of FIG. 13A and illustrating the transition from a biased configuration relative to a first noodle or a base-primary interface at a first ply zone end of the ply transition zone to an unbiased configuration at the base-primary interface at a second ply zone end of the ply transition zone;

FIG. 14A is a reference cross section of the stringer in the ply transition zone;

FIG. 14B is a schematic illustration of the ply layup of the first and second webs and cap taken along line 14B-14B of FIG. 14A and illustrating the transition from the biased configuration at a primary-wrap interface at the first ply zone end to the unbiased configuration at the primary-wrap interface at the second ply zone end;

FIG. 15A is a reference cross section of the stringer in the ply transition zone;

FIG. 15B is a schematic illustration of the ply layup of the base center taken along line 15B-15B of FIG. 15A and illustrating the transition from a first laminate thickness at the first ply zone end to a second laminate thickness at the second ply zone end;

FIGS. 16A-16B are reference cross sections of the stringer in the ply transition zone;

FIG. 16C is a chart illustrating a ply layup of primary plies, wrap plies and base plies;

FIG. 17A is a reference cross section of the stringer in the ply transition zone;

FIG. 17B is a chart illustrating a ply layup of the wrap plies and base plies;

FIGS. 19-22 are partial sectional illustrations of the intersection of the base laminate, wrap laminate and primary laminate and illustrating a sequence in transitioning from a biased configuration to an unbiased configuration;

FIG. 23 is a partial sectional illustration of the intersection of the base laminate, wrap laminate and primary laminate at the second ply zone end of the ply transition zone and illustrating an unbiased configuration;

DETAILED DESCRIPTION

Figure 1:
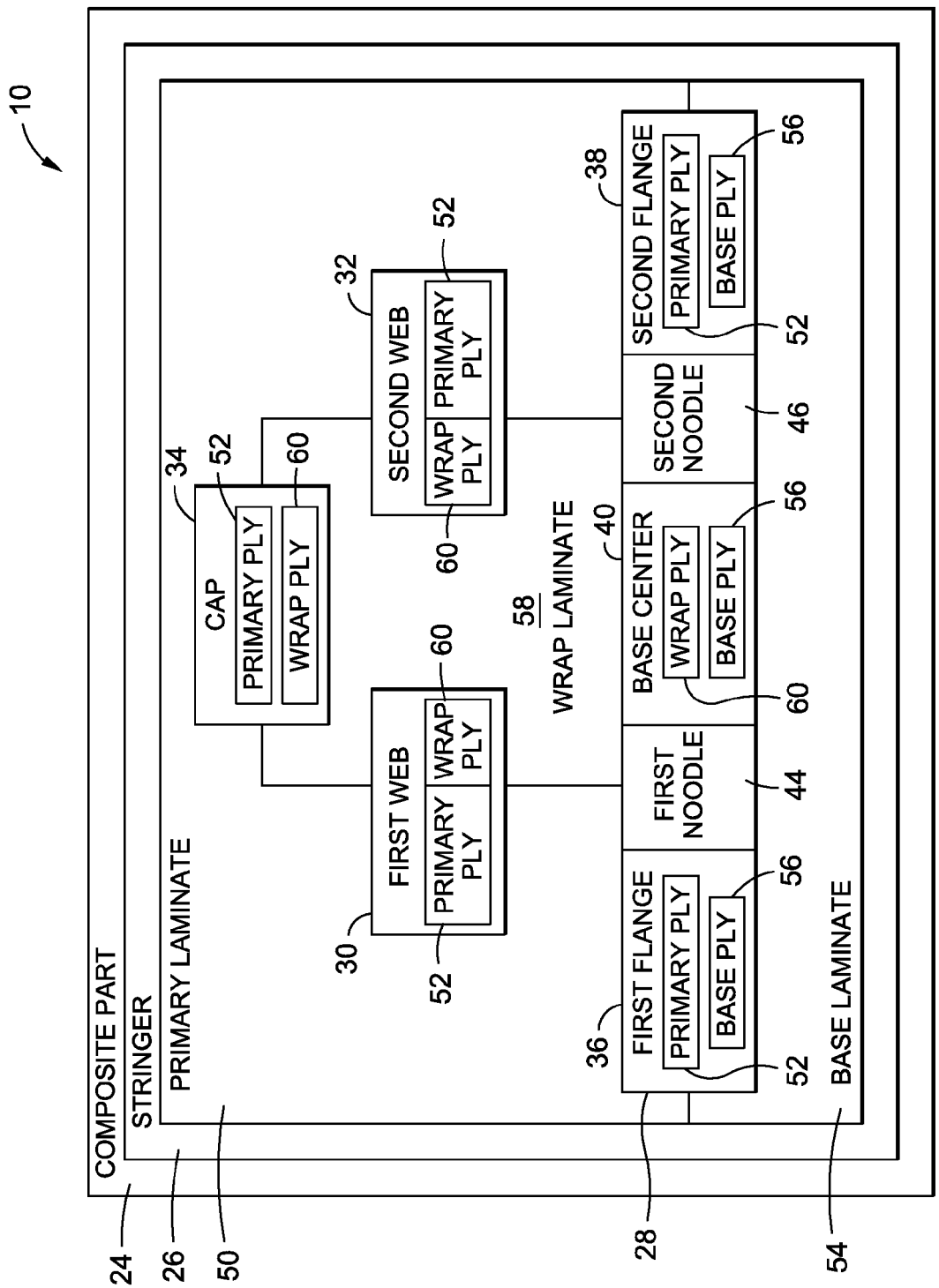
FIG. 1 is functional block diagram of a composite part such as a stringer that may be formed of a base laminate, a wrap laminate and a primary laminate.

Referring now to the drawings wherein the showings are for purposes of illustrating preferred and various embodiments of the disclosure only and not for purposes of limiting the same, shown in FIG. 1 is a structure 10 such as a composite part 24 which may comprise a stringer 26 formed of a base laminate 54, a primary laminate 50 and a wrap laminate 58. The stringer 26 may include first and second flanges 36, 38 which may be interconnected by a base center 40. The stringer 26 may include a pair of first and second webs 30, 32 which may extend outwardly from the first and second flanges 36, 38, respectively, and which may be interconnected by a cap 34. The first flange 36 may intersect with the base center 40 and first web 30 at a first noodle 44. The second flange 38 may intersect with the base center 40 and the second web 32 at a second noodle 46. The base laminate 54 may have a generally planar shape (FIGS. 4 and 12) and may be comprised of base plies 56 which may be formed of fiber reinforced material although any material may be used. The primary laminate 50 may have a generally hat-shaped cross-section (FIGS. 4 and 10) along at least a portion of a length thereof and may be formed of primary plies 52. The wrap laminate 58 may have a closed cross-sectional shape (FIGS. 4 and 11) along at least a portion of a length thereof and may be formed of wrap plies 60. The wrap laminate may be nested within the primary laminate as shown in FIGS. 1, 3, and 4. The primary laminate may be flush against the base laminate to form a base portion including the first and second flanges (FIGS. 1, 3, and 4).

As can be seen in FIG. 1, the primary plies 52 may comprise at least a portion of the first flange 36, first web 30, cap 34, second web 32 and second flange 38. The wrap plies 60 may comprise at least a portion of the base center 40, first web 30, second web 32 and cap 34. The base plies 56 may comprise at least a portion of the first flange 36, base center 40 and second flange 38. Each one of the first and second flanges 36, 38 may be formed of a portion of the primary plies 52 and base plies 56. The base center 40 may be formed of wrap plies 60 and base plies 56. Each one of the first and second webs 30, 32 may be formed of primary plies 52 and wrap plies 60. Likewise, the cap 34 may be formed of primary plies 52 and wrap plies 60.

Figure 5:
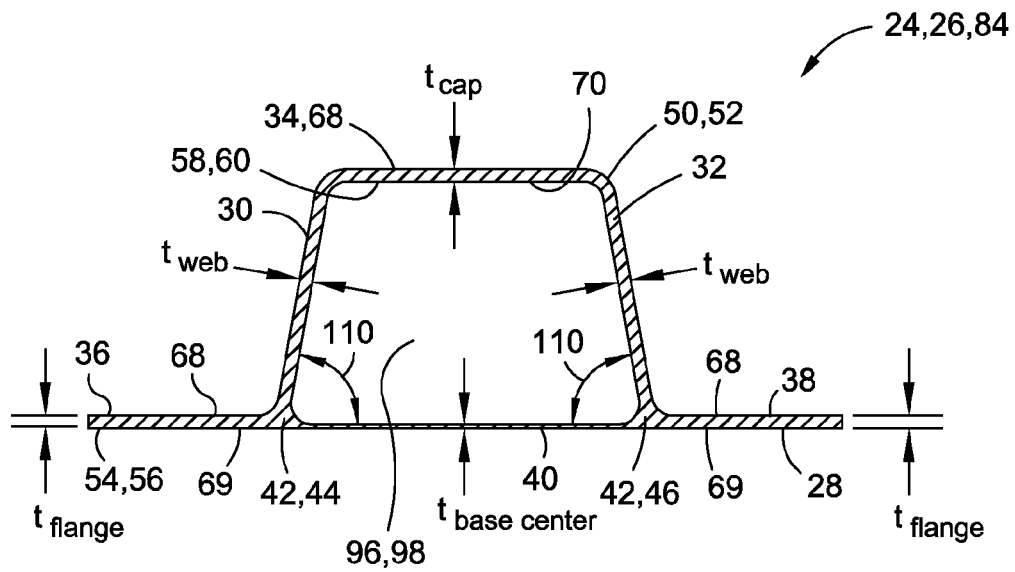
FIG. 5 is a cross-sectional illustration of the stringer taken along line 5-5 of FIG. 3 and illustrating a base portion of the stringer comprising first and second flanges having first and second webs extending upwardly therefrom and being interconnected by the cap and wherein the first and second webs may be oriented at a first angle.
Figure 6:
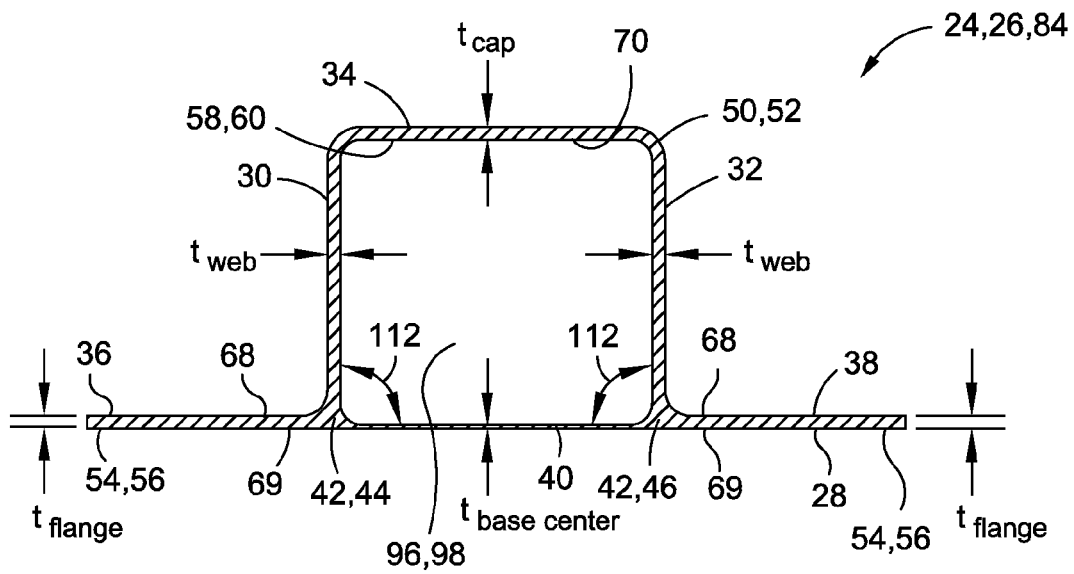
FIG. 6 is a cross-sectional illustration of the stringer taken along line 6-6 of FIG. 3 and illustrating the first and second webs being oriented at a second angle which may be different than the first angle of the first and second webs as shown in FIG. 5.
Figure 7:
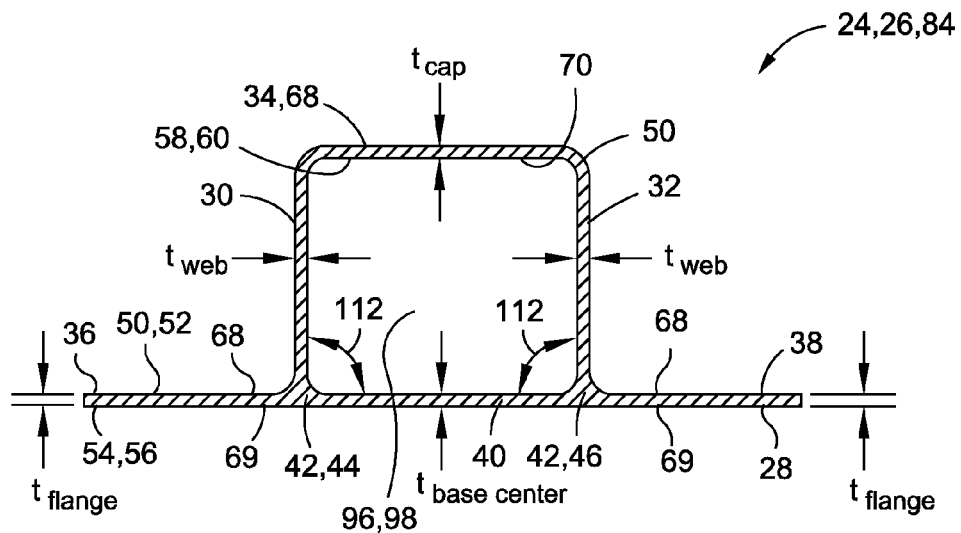
FIG. 7 is a cross-sectional illustration of the stringer taken along line 7-7 of FIG. 3 and illustrating an increase in a thickness of the base center interconnecting the first and second flanges as a result of an increase in a quantity of wrap plies of the wrap laminate within a ply transition zone.
Figure 8:
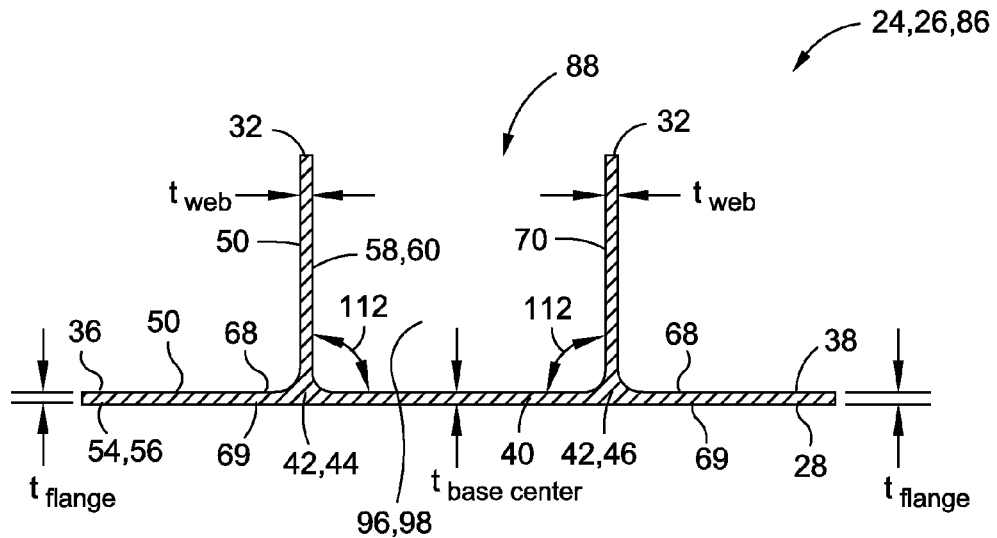
FIG. 8 is a cross-sectional illustration of the stringer taken along line 8-8 of FIG. 3 and illustrating the stringer having the cap removed from a portion thereof.
Figure 10:
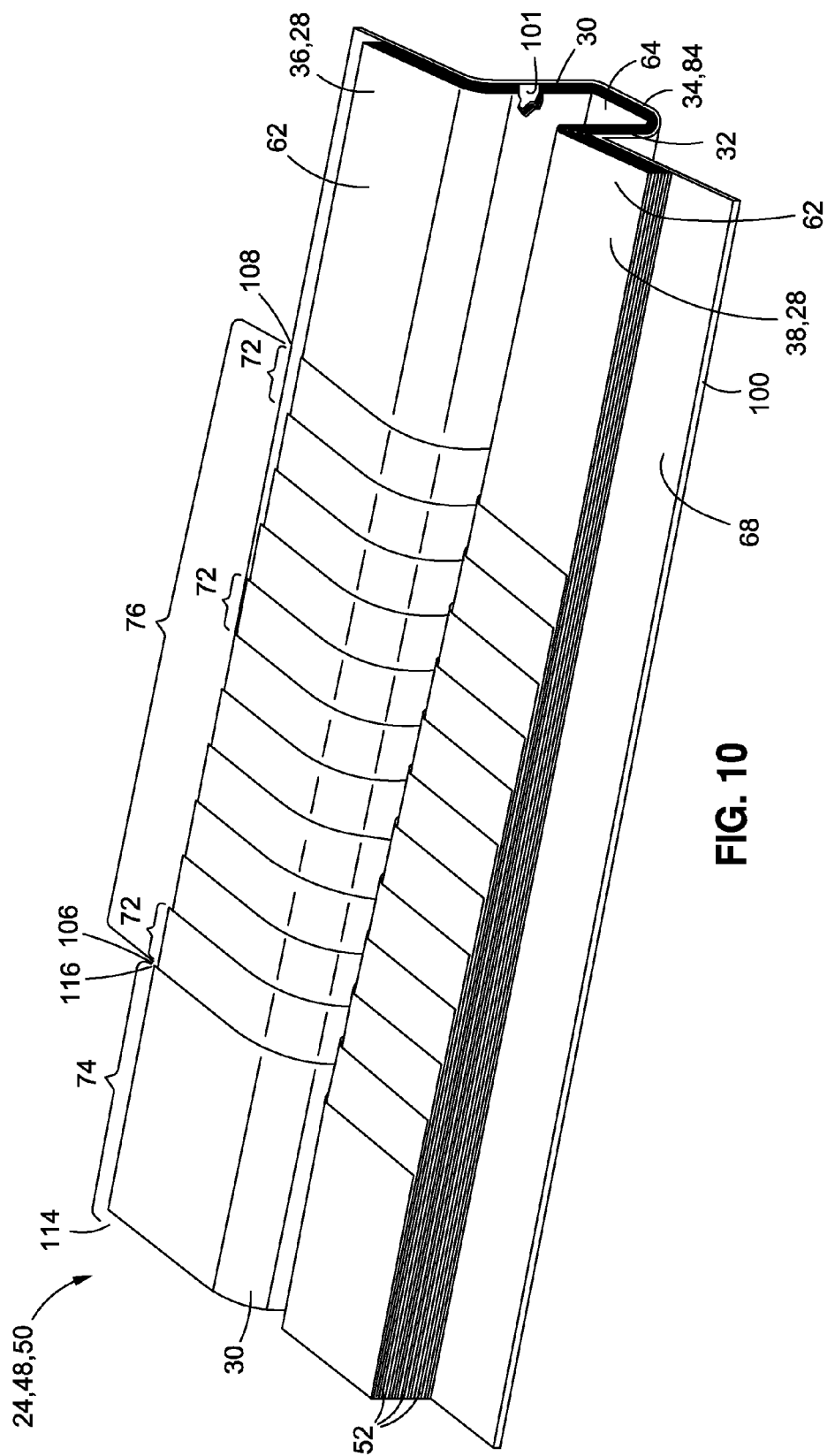
FIG. 10 is a perspective illustration of the primary laminate flipped vertically relative to the orientation shown in FIG. 4 and illustrating the incremental decrease in primary plies along the ply transition zone along a direction from the inboard section to the outboard section of the primary laminate.
Figure 11:
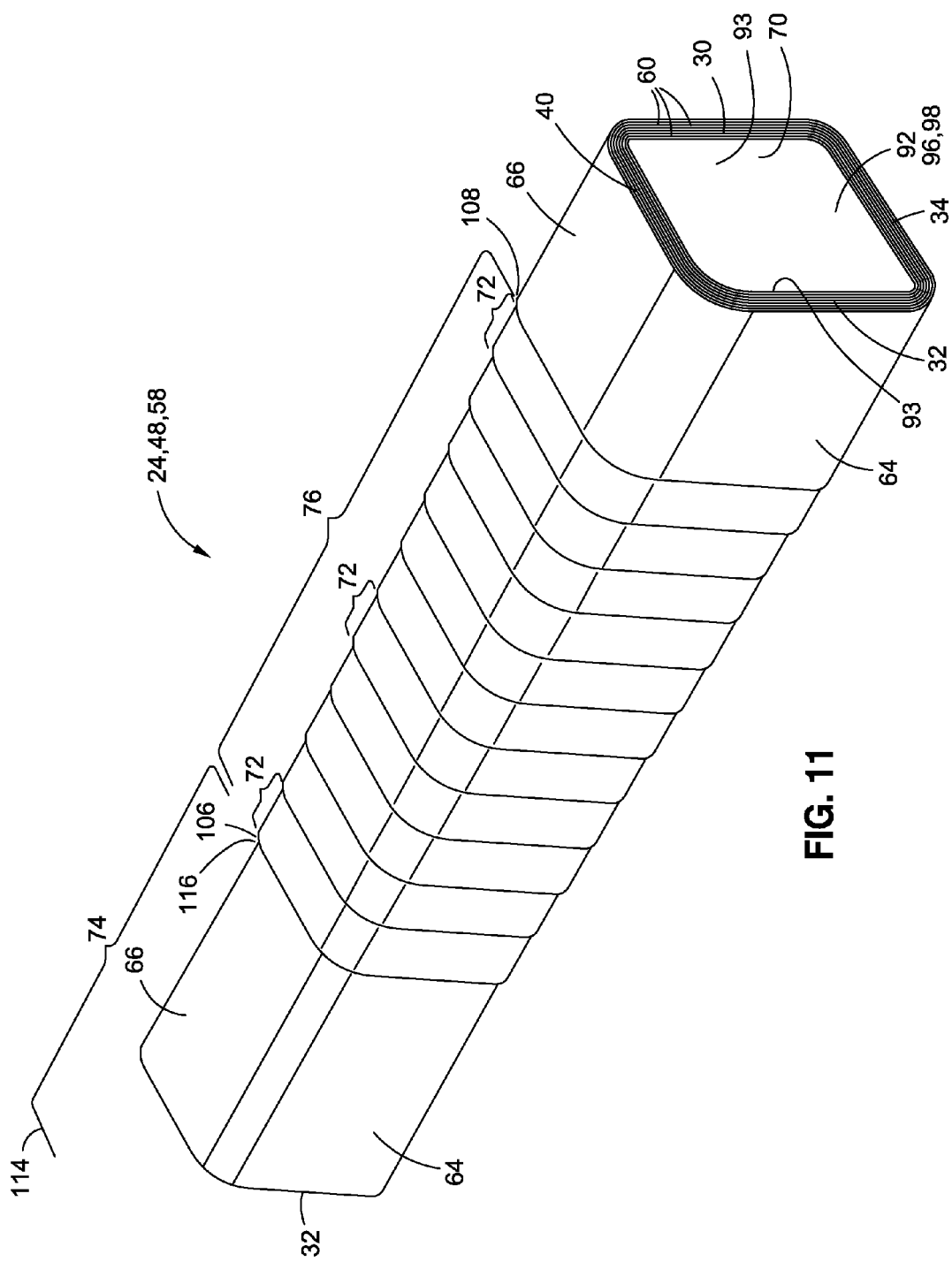
FIG. 11 is a perspective illustration of the wrap laminate flipped vertically relative to the orientation shown in FIG. 4 and illustrating the incremental increase in wrap plies along the ply transition zone in correspondence with the incremental decrease in primary plies.
Figure 12:
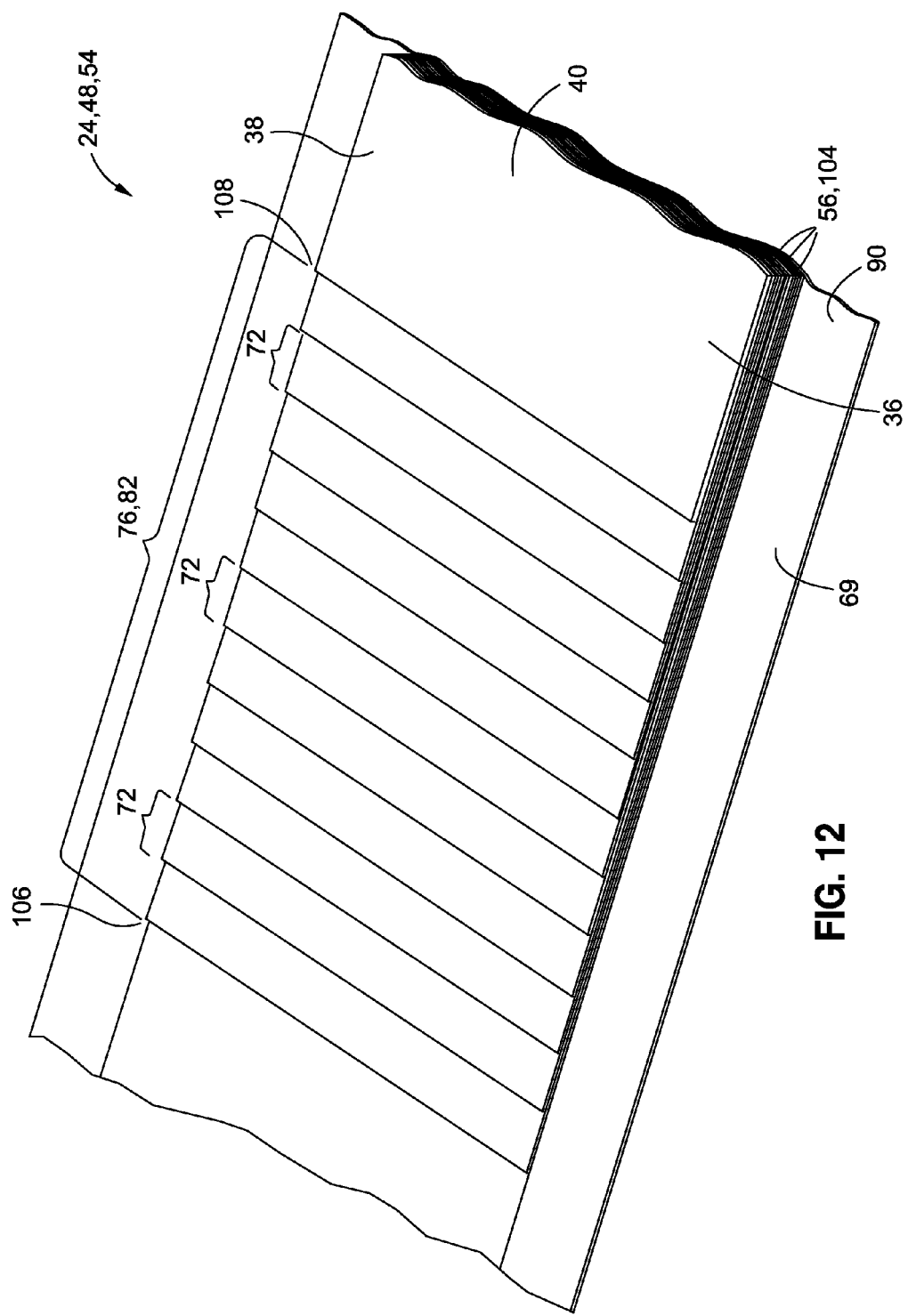
FIG. 12 is a perspective illustration of the base laminate flipped vertically relative to the orientation shown in FIG. 4 and illustrating the incremental increase in base plies along the ply transition zone in correspondence with the incremental decrease in primary plies and incremental increase in wrap plies.

As described in greater detail below, the stringer 26 is configured such that at least one of the first and second webs 30, 32 transitions from a first angle 110 as shown in FIGS. 5 and 9B to a second angle 112 as shown in FIGS. 6 and 9C within an angle transition zone 74 as shown in FIGS. 4 and 9A. In addition, as shown in FIGS. 10-12, a ply layup 48 of the first and second flanges 36, 38 and the base center 40 as well as the ply layup 48 of the first and second webs 30, 32 and cap 34 may transition within a ply transition zone 76. For example, in an embodiment, the stringer 26 may be provided in a hat section 84 as shown in FIGS. 5-7 which may be transitioned to a dual-blade section 86 as shown in FIG. 8 wherein the cap 34 may be at least partially removed as shown in FIG. 3. By transitioning the orientation of the first and second webs 30, 32 from the first angle 110 to the second angle 112 and/or by altering the ply layup 48 of the stringer 26, the need for separate fittings for stabilizing the webs may be eliminated.

Figure 6A:
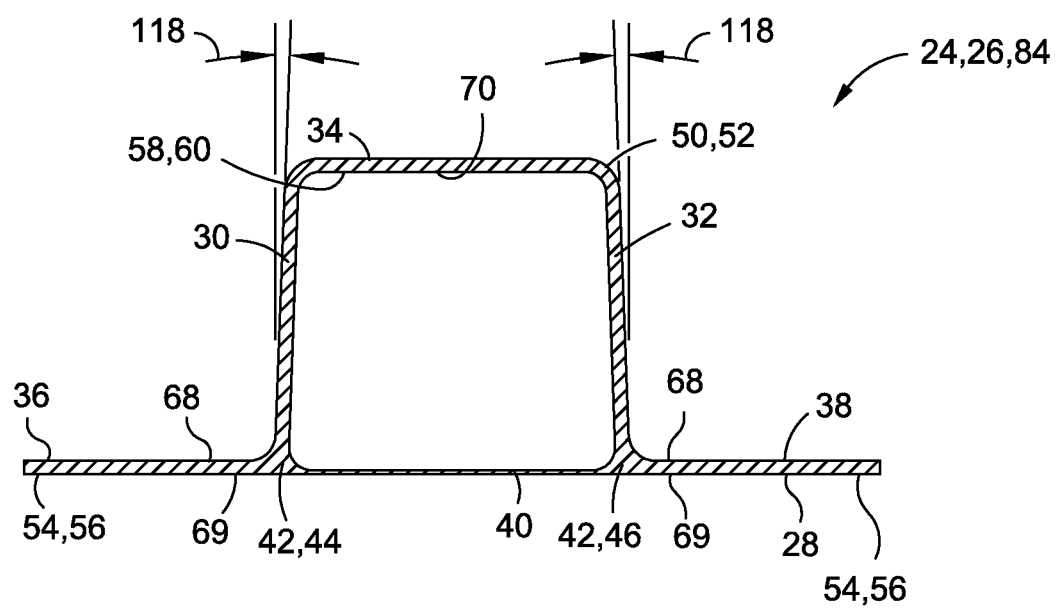
FIG. 6A is a cross-sectional illustration of the stringer similar to that which is illustrated in FIG. 6 and illustrating the first and second webs being oriented at a draft angle relative to a substantially perpendicular orientation of the first and second webs.

For example, as shown in FIGS. 5-6, the system and method disclosed herein provides a means for transitioning a cross-section of the stringer 26 from one in which the first and second webs 30, 32 may be oriented in a non-perpendicular angle relative to the first and second flanges 36, 38 as shown in FIG. 5 to a substantially perpendicular angle relative to the first and second flanges 36, 38 as shown in FIG. 6. Optionally, as shown in FIG. 6A, the first and second webs 30, 32 may transition to a non-perpendicular angle that is near perpendicular but which may include a draft angle 118 of up to five degrees or more relative to a substantially perpendicular orientation to facilitate removal of tooling following curing of the stringer 26. In addition, the system and method as disclosed herein provides a means for transitioning a ply layup 48 of the first and second flanges 36, 38, the first and second webs 30, 32 and the base center 40 from a biased configuration 78, as shown in FIGS. 13B and 14B, wherein the quantity of plies may be biased to one side of the first and second noodles 44, 46, to an unbiased configuration 80, as also shown in FIGS. 13B and 14B, wherein the quantity of plies are generally uniformly distributed about the first and second noodles 44, 46 as will be described in greater detail below.

Figure 2:
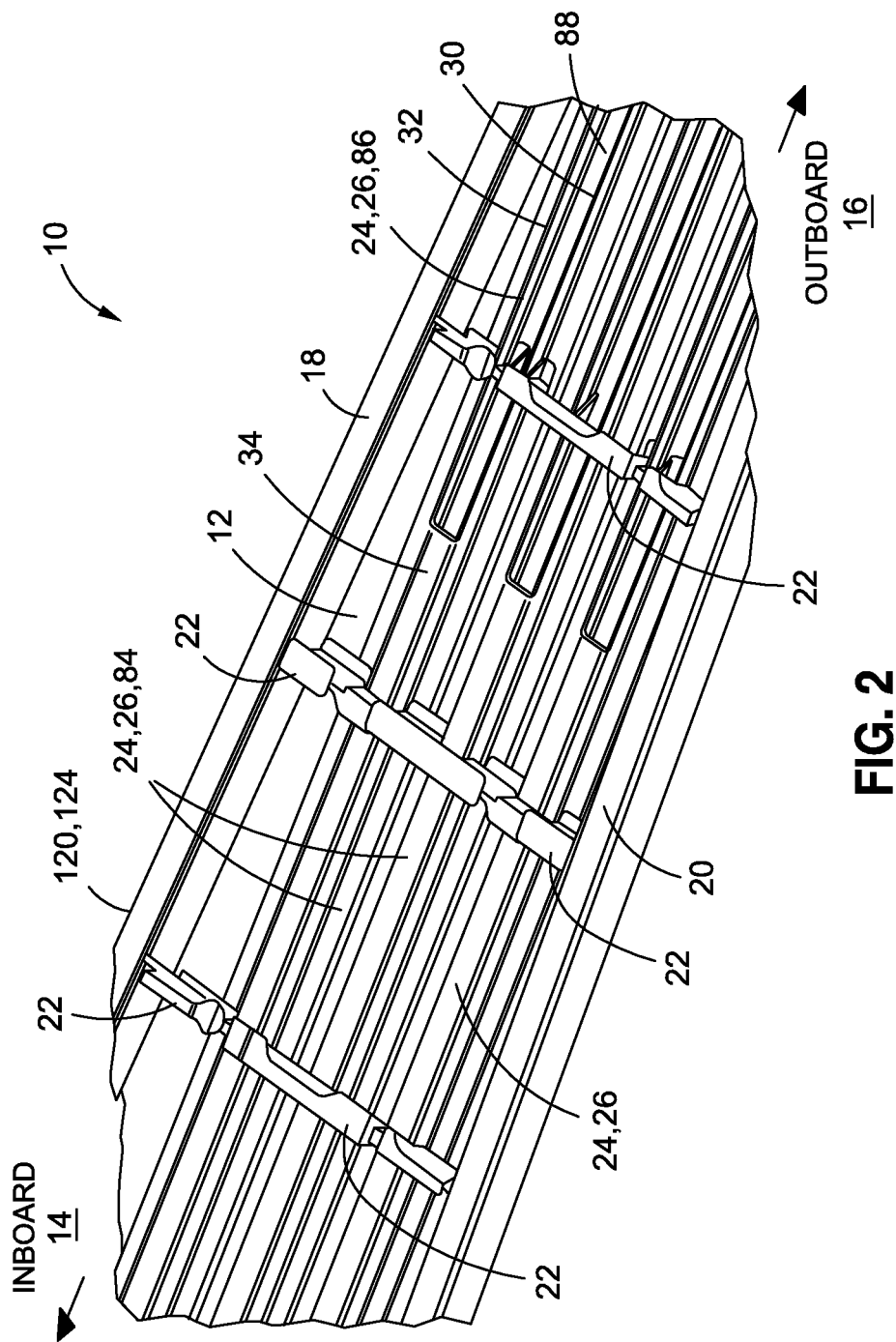
FIG. 2 is a perspective illustration of an aircraft wing panel in an embodiment incorporating stringers extending from an inboard section to an outboard section of the wing panel.

Referring to FIG. 2, shown is a structure 10 configured as an aircraft 120, wing 124 having front and rear spars 18, 20 interconnected by a plurality of ribs 22 located at spaced intervals along a span of the wing 124. The structure 10 may include one or more stringers 26 which may be coupled to a skin member 12 for stiffening thereof. The stringers 26 may, in turn, be interconnected to the ribs 22. As shown in FIG. 2, the stringers 26 may be configured as vent stringers 26 extending from an inboard 14 portion of the wing 124 to an outboard 16 portion of the wing 124. In this manner, the closed hat section 84 of the stringers 26 may optionally function as a conduit for venting fuel vapors such as from fuel tanks which may be located at an inboard 14 portion of the wing 124. However, the stringer 26 may function to vent any number of different fluids without limitation or serve as a conduit for other systems or elements. In this regard, each one of the stringers 26 may be provided with an opening 88 wherein a portion of the cap 34 which interconnects the first and second webs 30, 32 may be removed. In such an arrangement, the stringer 26 may transition from a hat section 84 to a dual-blade section 86.

Figure 18:
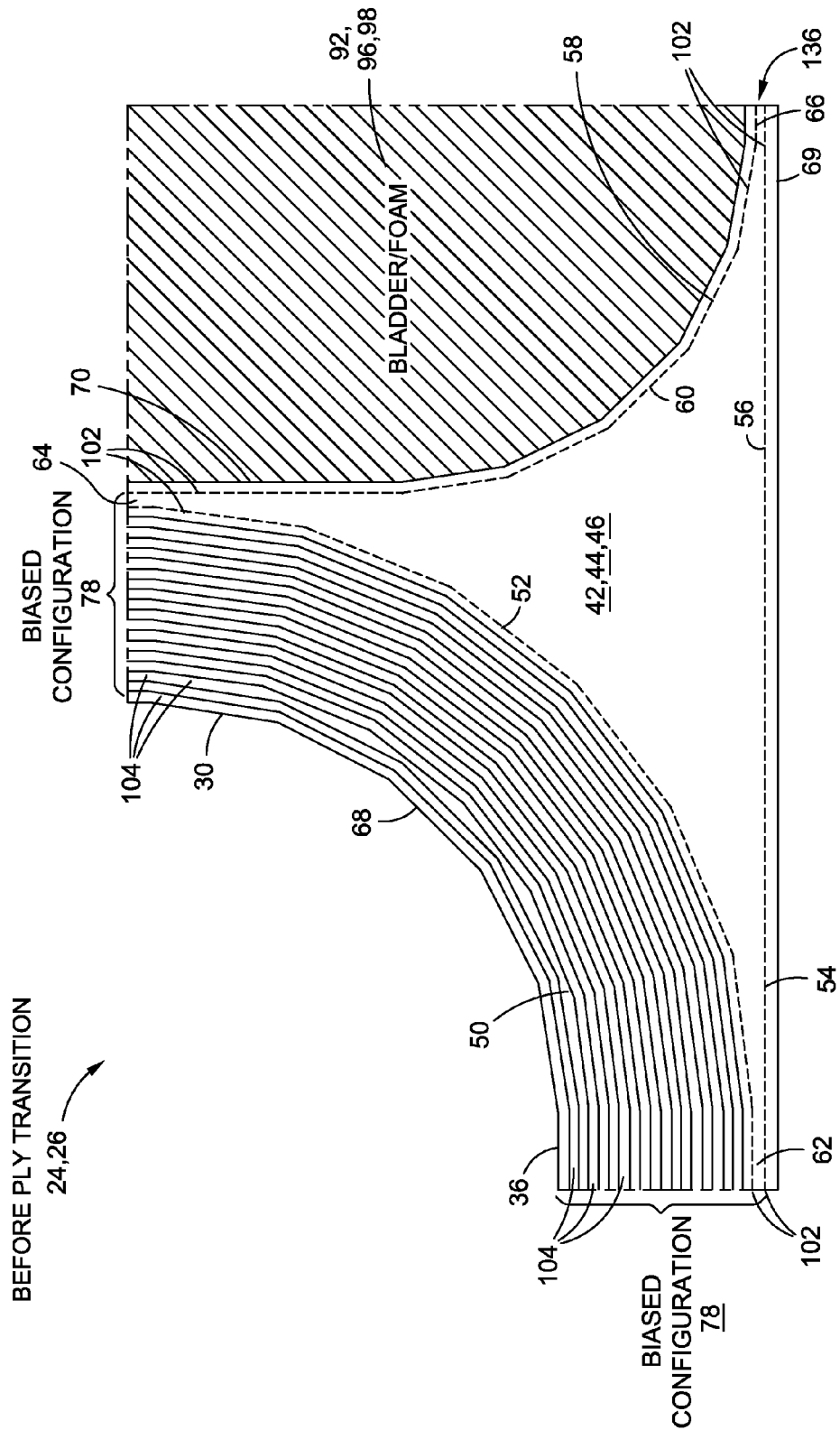
FIG. 18 is a partial sectional illustration of a first noodle or intersection of the base laminate, primary laminate and wrap laminate at the first ply zone end of the ply transition zone and illustrating a biased configuration at the base-primary interface, the primary-wrap interface and the wrap-base interface.

Referring to FIGS. 3-8 and 10-14B, shown in FIG. 3 is a perspective illustration of one of the stringers 26 coupled to a skin member 12. As can be seen, the stringer 26 may include the angle transition zone 74 wherein the orientation of at least one of the first and second webs 30, 32 transitions from the first angle 110 as shown in FIG. 5 to the second angle 112 as shown in FIGS. 6-8. Furthermore, FIG. 10 illustrates the ply transition zone 76 wherein a ply layup 48 of the base portion 28 and the first and second webs 30, 32 may transition from a biased configuration 78 at the first ply zone end 106 as shown in FIGS. 13B and 14B, to an unbiased configuration 80 at the second ply zone end 108 as also shown in FIGS. 13B and 14B. In this regard, the ply transition zone 76 comprises a location along the stringer 26 wherein the plies of the laminates that interface with one another to form the stringer 26 are incrementally increased in one laminate in correspondence with an incremental decrease in the plies of the facing laminate. For example, referring briefly to FIG. 18, shown is an intersection of the base laminate 54, wrap laminate 58 and primary laminate 50 wherein the base plies 56, wrap plies 60 and primary plies 52 comprise the biased configuration 78 at the first ply zone end 106 of the ply transition zone 76. Referring briefly to FIG. 23, shown is the unbiased configuration 80 of the base laminate 54, wrap laminate 58 and primary laminate 50 at the second ply zone end 108 of the ply transition zone 76. Advantageously, by incrementally increasing (i.e., adding) and decreasing (i.e., dropping) plies within the ply transition zone 76, the stringer 26 can be morphed from the biased configuration 78 to the unbiased configuration 80.

Referring to FIG. 3, it should be noted that the stringer 26 may include one or more angle transition zones 74 and/or one or more ply transition zones 76 and is not limited to a single one of each. Furthermore, the present disclosure contemplates a stringer 26 configuration having only one or more ply transition zones 76 and not having an angle transition zone 74. Conversely, the present disclosure contemplates a stringer 26 configuration having only one or more angle transition zones 74 and not having a ply transition zone 76. Even further, the present disclosure contemplates an arrangement wherein only one of the first and second webs 30, 32 of the stringer 26 includes the angle transition zone 74. The present disclosure also contemplates a stringer 26 configuration having only a single one of the first and second flanges 36, 38 and including only a single one of the first and second webs 30, 32 extending outwardly from the single one of the first and second flanges 36, 38.

Referring now to FIG. 4, shown is an exploded perspective illustration of the base laminate 54, wrap laminate 58 and primary laminate 50 which make up the stringer 26 as shown in FIG. 3. In this regard, FIG. 4 illustrates a configuration of each one of the laminates prior to assembling for co-curing or bonding to form the stringer 26. As can be seen, the location of the ply transition zone 76 of the primary laminate 50 corresponds to the location of the ply transition zone 76 of the wrap laminate 58 Likewise, the ply transition zone 76 of the wrap laminate 58 and primary laminate 50 correspond to the ply transition zone 76 of the base laminate 54. Even further, the angle transition zone 74 of the wrap laminate 58 corresponds to the angle transition zone 74 of the primary laminate 50.

Referring to FIG. 5, shown is a sectional illustration of the stringer 26 taken along line 5-5 of FIG. 3 and illustrating the orientation of the first and second webs 30, 32 at the first angle 110. As was earlier indicated, the first angle 110 transitions to the second angle 112 along the angle transition zone 74. As shown in FIG. 5, at least one of the first and second webs 30, 32 may define a non-perpendicular orientation at the first angle zone end 114 relative to the base portion 28. In an embodiment, each one of the first and second webs 30, 32 may be angled inwardly relative to one another at the first angle zone end 114. In this configuration, the hat section 84 of the stringer 26 defines a trapezoidal cross-sectional configuration. However, the stringer 26 may define any cross sectional configuration, without limitation, including any closed cross sectional configuration.

Referring to FIG. 6, shown is a sectional illustration taken along line 6-6 of FIG. 3 and illustrating an orientation of the first and second webs 30, 32 at the second angle zone end 116 of the angle transition zone 74. In this regard, each one of the first and second webs 30, 32 is illustrated as defining a substantially perpendicular orientation relative to the base portion 28 (i.e., relative to the first and second flanges 36, 38). It should be noted that although the stringer 26 is illustrated as having a non-perpendicular orientation of the first and second webs 30, 32 at the first angle zone end 114 of the angle transition zone 74, the first and second webs 30, 32 may be oriented substantially perpendicularly relative to the base portion 28 at the first angle zone end 114 Likewise, although the first and second webs 30, 32 are illustrated as defining a substantially perpendicular orientation at the second angle zone end 116 of the angle transition zone 74, the first and second webs 30, 32 may define a non-perpendicular orientation relative to the base portion 28.

Even further, it is contemplated that the first and second webs 30, 32 may transition from non-perpendicular orientations relative to the base portion 28 or to different non-perpendicular orientations relative to the base portion 28. Additionally, the present disclosure contemplates an orientation of the first web 30 that is different than an orientation of the second web 32 at any point along the stringer 26 including at any point along the angle transition zone 74 of the first and second webs 30, 32. However, for purposes of improving the stability of the first and second webs 30, 32 at a location of the stringer 26 wherein the cap 34 is removed, the first and second webs 30, 32 may be oriented substantially perpendicularly relative to the base portion 28.

Referring briefly to FIG. 7, shown is a sectional illustration taken alone line 7-7 of FIG. 3 and illustrating an increased thickness $t_{base\ center}$ of the base center 40 at the second ply zone end 108 within the ply transition zone 76 as compared to the thickness $t_{base\ center}$ of the base center 40 at the first ply zone end 106. The increased thickness $t_{base\ center}$ of the base center 40 is a result of an incremental increase in the quantity of the wrap plies 60 and base plies 56 within the within of the ply transition zone 76 as will be described in greater detail below.

Referring briefly to FIG. 8, shown is a sectional illustration taken alone line 8-8 of FIG. 3 and illustrating a transition of the stringer 26 from a hat section 84 to a dual-blade section 86. The dual-blade section 86 may be formed by removing at least a portion of the cap 34 along the length of the stringer 26 as is illustrated in FIG. 3. The cap 34 may preferably be removed at a location outside of the ply transition zone 76 and the angle transition zone 74 although removal of the cap 34 may occur at any position along the length of the stringer 26.

Referring to FIGS. 9A-9D, shown in FIG. 9A is a plan view of the stringer 26 along the angle transition zone 74 wherein at least one of the first and second webs 30, 32 transitions from the first angle 110 to the second angle 112. FIG. 9B is a cross-sectional illustration of the stringer 26 taken at the first angle zone end 114 wherein at least one of the first and second webs 30, 32 may be oriented at the first angle 110. FIG. 9C is a cross-sectional illustration of the stringer 26 taken at the second angle zone end 116 zone wherein at least one of the first and second webs 30, 32 may be oriented at the second angle 112. FIG. 9D is a schematic illustration of the angle transition zone 74 illustrating an embodiment of the stringer 26 wherein at least one of the first and second webs 30, 32 may vary in transition rate. For example, the transition may initiate with the first and second webs 30, 32 being oriented in a non-perpendicular relationship relative to the first and second flanges 36, 38. In an embodiment, the first and second webs 30, 32 may be oriented at a 75 degree angle relative to the base portion 28 although the first angle 110 may comprise any orientation relative to the base portion 28 and is not limited to that which is illustrated.

Referring still to FIG. 9D, the transition from the first angle 110 to the second angle 112 may include linear or non-linear angle transition rates. For example, FIG. 9D illustrates an initial transition rate of 0.17 degrees per inch of the first 6 inches of the angle transition zone 74 in a direction from the first angle zone end 114 to the second angle zone end 116. The transition rate may increase to a higher rate of change such as the illustrated 0.20 degrees per inch transition rate within the next 10 inches of the angle transition zone 74. A more aggressive transition rate such as the 0.32 degrees per inch transition rate may be provided within the next 28 inches of the angle transition zone 74. The angle transition zone 74 may then provide for a gradual reduction in the transition rate. For example, the next 10 inches may include a transition rate of 0.20 degrees per inch followed by a transition rate of 0.17 degrees per inch in the final 6 inches of the angle transition zone 74. As may be appreciated, the transition of the first angle 110 to the second angle 112 may comprise a non-linear transition rate as indicated above although any combination of linear and non-linear translation rates may be incorporated into the angle transition zone 74. Furthermore, as was earlier mentioned, the orientations and transition rates of the first web 30 may be different than the orientations and transition rates of the second web 32 at any location along the stringer 26.

Referring to FIG. 10, shown is the primary laminate 50 in an orientation that has been flipped vertically relative to the orientation of the primary laminate 50 as shown in FIG. 4 in order to better illustrate a ply layup 48 of the primary laminate 50 within the ply transition zone 76. More specifically, FIG. 10 illustrates a plurality of primary plies 52 which make up the primary laminate 50 and which are shown in exaggerated thicknesses in order to illustrate the incremental or stepwise decrease in the quantity of primary plies 52 from the first ply zone end 106 of the ply transition zone 76 to the second ply zone end 108 thereof. FIG. 10 further illustrates the primary plies 52 of the primary laminate 50 being disposed on a cure mold 100 such that the primary ply 52 nearest the cure mold 100 assumes the shape of the tool surface 68. The primary laminate 50 comprises at least a portion of the first and second flanges 36, 38 which collectively define the base portion 28. Likewise, the primary laminate 50 comprises at least a portion of the first and second webs 30, 32. In this regard, the primary laminate 50 is combined with the wrap laminate 58 as illustrated in FIG. 11 to form the first and second webs 30, 32 and the cap 34 of the stringer 26 as will be described in greater detail below.

The primary laminate 50 may also include the angle transition zone 74 wherein at least one of the first and second webs 30, 32 transitions from the first angle 110 at the first angle zone end 114 as shown in FIG. 9B to the second angle 112 at the second angle zone end 116 as shown in FIG. 9C. The angle transition zone 74 is shown in FIG. 10 as being positioned in series relative to the ply transition zone 76. However, it is contemplated that the angle transition zone 74 and the ply transition zone 76 may be placed in partial or complete overlapping relationship relative to one another. In this regard, for a completely overlapping relationship of the angle transition zone 74 with the ply transition zone 76, the first and second webs 30, 32 transition from the first angle 110 to the second angle 112 simultaneous with the ply layup 48 transitioning from the first ply zone end 106 to the second ply zone end 108. However, for purposes of the present disclosure, the angle transition zone 74 is illustrated and described as being in series with and disposed adjacent to the ply transition zone 76. FIG. 10 further illustrates a succession of lap splices 72 wherein successive primary plies 52 of the primary laminate 50 overlap one another as the quantity of primary plies 52 incrementally decrease or are dropped within the ply transition zone 76. In this regard, although FIG. 10 illustrates the primary plies 52 being decreased or dropped along a bottom surface of the stringer 26, it is contemplated that the primary plies 52 may be decreased or dropped along a top surface of the stringer 26.

Referring to FIG. 11, shown is the wrap laminate 58 comprised of an incrementally increasing quantity of wrap plies 60 corresponding to the incremental decrease or drop in the quantity of primary plies 52 of the primary laminate 50 as shown in FIG. 10. More specifically, the lap splices 72 of the overlapping wrap plies 60 are preferably positioned in registration to the lap splices 72 of the incrementally decreasing primary plies 52 as illustrated in FIG. 10. The wrap laminate 58 may be formed by laying up the wrap plies 60 about a mandrel 92 such as a foam 98 mandrel or a bladder 96 which may be inflatable in order to permit removal of the mandrel 92 following curing of the wrap plies 60. However, the wrap laminate 58 may be formed by laying up wrap plies 60 about any suitable mandrel configuration and is not limited to foam 98 or a bladder 96. The mandrel 92 may include mandrel side walls 93. Removal of the mandrel 92 following laying up and curing of the wrap plies 60 results in the formation of the vent surfaces 70 on the interior side of the wrap laminate. The vent surfaces 70 may collectively define an interior portion of the wrap laminate 58.

Referring to FIG. 12, shown is the base laminate 54 having a ply transition ramp 82 or ply transition zone 76 wherein the base plies 56 are laid up on a mold line surface 69 of a base mold 90 and where the quantity of base plies 56 may be incrementally increased or added within the ply transition zone 76. As shown in FIG. 4 through 12, the layup of the primary plies 52, wrap plies 60 and base plies 56 is preferably in equal increments and in registration with one another such that the respective plies overlap with one another at the lap splices 72. However, the layup of the primary plies 52, wrap plies 60 and base plies 56 may be in varying or unequal increments or in any suitable increment along the ply transition zone 76.

Referring to FIGS. 13A to 13B, shown is a layup of the primary plies 52 to form the primary laminate 50 within the ply transition zone 76. As can be seen in FIG. 13B, the base laminate 54 defines a base-primary interface 62 with the primary laminate 50. The first and second flanges 36, 38 transition from a biased configuration 78 at the first ply zone end 106 to an unbiased configuration 80 at the second ply zone end 108 as measured about the base-primary interface 62 as shown in FIG. 13A. In an embodiment, the primary laminate 50 includes lap splices 72 between successive decreases or drops of the primary plies 52 of the primary laminate 50 (or increases in the base plies 56 of the base laminate 54). Although a 0.75 inch lap splice 72 is illustrated and described in the present disclosure, the lap splice 72 may comprise any suitable distance. For example, the lap splice 72 may comprise anywhere from 0.01 inch or less to 2.0 inches or more between successive increases or decreases in plies. In an embodiment, the lap splices 72 are preferably sized in proportion to a thickness of the plies. The length of the lap splice 72 may be sized at a predetermined multiple of the thickness of the plies. For example, for a ply thickness of 0.0075 inch, a multiple of 100 may dictate a 0.75 inch lap splice. However, the lap splice 72 may be provided in any length and a not limited to a given multiple of the thickness of the plies. Furthermore, the lap splices 72 may be arranged in any increment within the ply transition zone 76 including equal increments, unequal increments, or varying combinations thereof.

Referring to FIGS. 14A to 14B, shown is an arrangement similar to that which is shown in FIGS. 13A-13B wherein the cap 34 and the first and second webs 30, 32 comprise a biased configuration 78 at the first ply zone end 106 transitioning to an unbiased configuration 80 at the second ply zone end 108 as measured about the primary-wrap interface 64. As can be seen in FIG. 14B, the incremental decrease in the quantity of primary plies 52 of the primary laminate 50 is in correspondence with the incremental increase in wrap plies 60 of the wrap laminate 58 to form the first and second webs 30, 32. FIG. 14B illustrates the lap splice 72 in correspondence with the lap splice 72 illustrated in the first and second flanges 36, 38 and described above in FIG. 13B.

Referring to 15A to 15B, shown is the base center 40 comprised of wrap plies 60 of the wrap laminate 58 and base plies 56 of the base laminate 54. As can be seen, the increase or adding of wrap plies 60 and the increase or adding of base plies 56 results in an overall increase in the thickness $t_{base\ center}$ of the base center 40. For example and referring briefly to FIGS. 6 and 7, shown in FIG. 6 is an initial thickness $t_{base\ center}$ of the base center 40 at the first ply zone end 106 of the ply transition zone 76. FIG. 7 illustrates an increased thickness $t_{base\ center}$ of the base center 40 at the second ply zone end 108 as a result of the incremental increase in the quantity of wrap plies 60 and base plies 56. As can be seen in FIG. 15B, the wrap laminate 58 and base laminate 54 define the wrap-base interface 66. In the embodiment shown, the ply layup 48 of the wrap plies 60 and base plies 56 is such that the base center 40 may have a first laminate thickness 136 at the first ply zone end 106 and a second laminate thickness 138 at the second ply zone end 108. However, the second laminate thickness 138 may comprise a greater quantity of wrap plies 60 and base plies 56 as compared to the first laminate thickness 136. Furthermore, the second laminate thickness 138 may comprise an equal quantity or a reduced quantity of wrap plies 60 and base plies 56 as compared to the first laminate thickness 136 depending, in part, upon the initial quantity of plies in the wrap laminate 58 and base laminate 54 at the first ply zone end 106 and/or depending on whether such plies are increasing or decreasing in quantity within the ply transition zone 76

Referring to FIGS. 16A-16C, shown in FIG. 16C is a chart illustrating a ply layup 48 of the first and second flanges 36, 38 referenced in FIG. 16A and which may correspond to a ply layup 48 of the first and second webs 30, 32 referenced in FIG. 16B. The chart illustrates an arrangement of fabric plies 102 and tape plies 104 of varying orientations and is provided for illustration purposes only and is not to be construed as limiting alternative ply arrangements. The chart illustrates a layup comprising a fabric ply 102 of the primary laminate 50 disposed on the tool surface 68 followed by a layup of tape plies 104 oriented at 0 degrees, plus 45 degrees, minus 45 degrees and 90 degrees, etc. It should be noted that the specific fiber orientations of the various wrap plies 60, primary plies 52 and base plies 56 may be provided in any arrangement and may be optimized for a given set of manufacturing, environmental and/or static and dynamic loading conditions, etc. In this regard, the arrangement of tape plies 104 and fabric plies 102 may be provided in a variety of alternative patterns other than that which is shown in FIG. 16C.

However, FIG. 16C illustrates a feature of the present disclosure wherein the ply layup 48 of the primary plies 52, wrap plies 60 and base plies 56 which make up the first and second flanges 36, 38 and the first and second webs 30, 32 may transition from a biased configuration 78 at the first ply zone end 106 to an unbiased configuration 80 at the second ply zone end 108. For example, in the biased configuration 78, the first ply zone end 106 on the left-hand side of the chart of FIG. 16C illustrates the quantity of primary plies 52 that make up the primary laminate 50 as being greater in number that the single wrap ply 60 and the single base ply 56 which is illustrated as a fabric ply 102. In the unbiased configuration 80 at the second ply zone end 108 on the right-hand side of the chart of FIG. 16C, the quantity of primary plies 52 are equal in number to the quantity of tape plies 104 which make up the wrap plies 60 and base plies 56.

FIGS. 17A-17B illustrate a ply layup 48 of the base center 40 of the stringer 26 within the ply transition zone 76 wherein the ply layup 48 transitions from a first laminate thickness 136 to a second laminate thickness 138 which may be increased in thickness as compared to the first laminate thickness 136. A can be seen, the ply layup 48 of the base plies 56 may incrementally increase in correspondence with the incremental increase of the wrap plies 60. The ply layup 48 of the base plies 56 as shown in FIG. 17B corresponds to the ply layup 48 of the base plies 56 as shown in FIG. 16C. As may be appreciated, the specific ply layup 48 of the base center 40 may be altered by altering the ply layup 48 of the wrap plies 60 or by altering the ply layup 48 of the base plies 56. In this regard, although the base center 40 illustrates an arrangement wherein the base plies 56 minor the wrap plies 60 about the wrap-base interface 66, a non-mirrored arrangement may be provided Referring to FIGS. 18 through 23, shown are enlarged sectional illustrations of the intersection of the first web 30 with the first flange 36 at the first noodle 44 and which may optionally minor the arrangement at the intersection of the second web 32 with the second flange 38. As can be seen, FIGS. 18 through 23 illustrate the transition in the primary laminate 50 and wrap laminate 58 from a biased configuration 78 at the first ply zone end 106 to an unbiased configuration 80 at the second ply zone end 108, and the transition of the wrap-base interface 66 from a first laminate thickness 136 to a second laminate thickness 138. For example, FIG. 18 illustrates a cross-section of the first web 30 with the first flange 36 prior to the initiation of the transition of the ply layup 48. As can be seen, the ply layup 48 of the primary plies 52 comprise a plurality of tape plies 104 and a single fabric ply 102 on an interior side of the ply layup 48 although the ply layup 48 may comprise alternative ply materials on the interior side of the ply layup 48 and any number of alternative ply materials laid over the initial ply. In this regard, FIG. 18-25 are illustrative of a sequence about which the ply layup 48 of the stringer 26 may be transitioned and is not to be construed as limiting alternative ply arrangements of the stringer 26. The ply layup 48 of the wrap laminate 58 may comprise any number of ply materials. For example, the ply layup 48 may include the single fabric ply 102 as shown which may be laid up on a suitable mandrel 92 such as a bladder 96 or a foam 98 mandrel 92. The base laminate 54 is shown also as comprising a fabric ply 102 although any ply material may be used. As shown in FIG. 18, the stringer 26 may have the biased configuration 78 at the base-primary interface 62 and primary-wrap interface 64 at the first ply zone end 114. FIG. 18 also illustrates the first laminate thickness 136 at the wrap-base interface 66.

Figure 19:
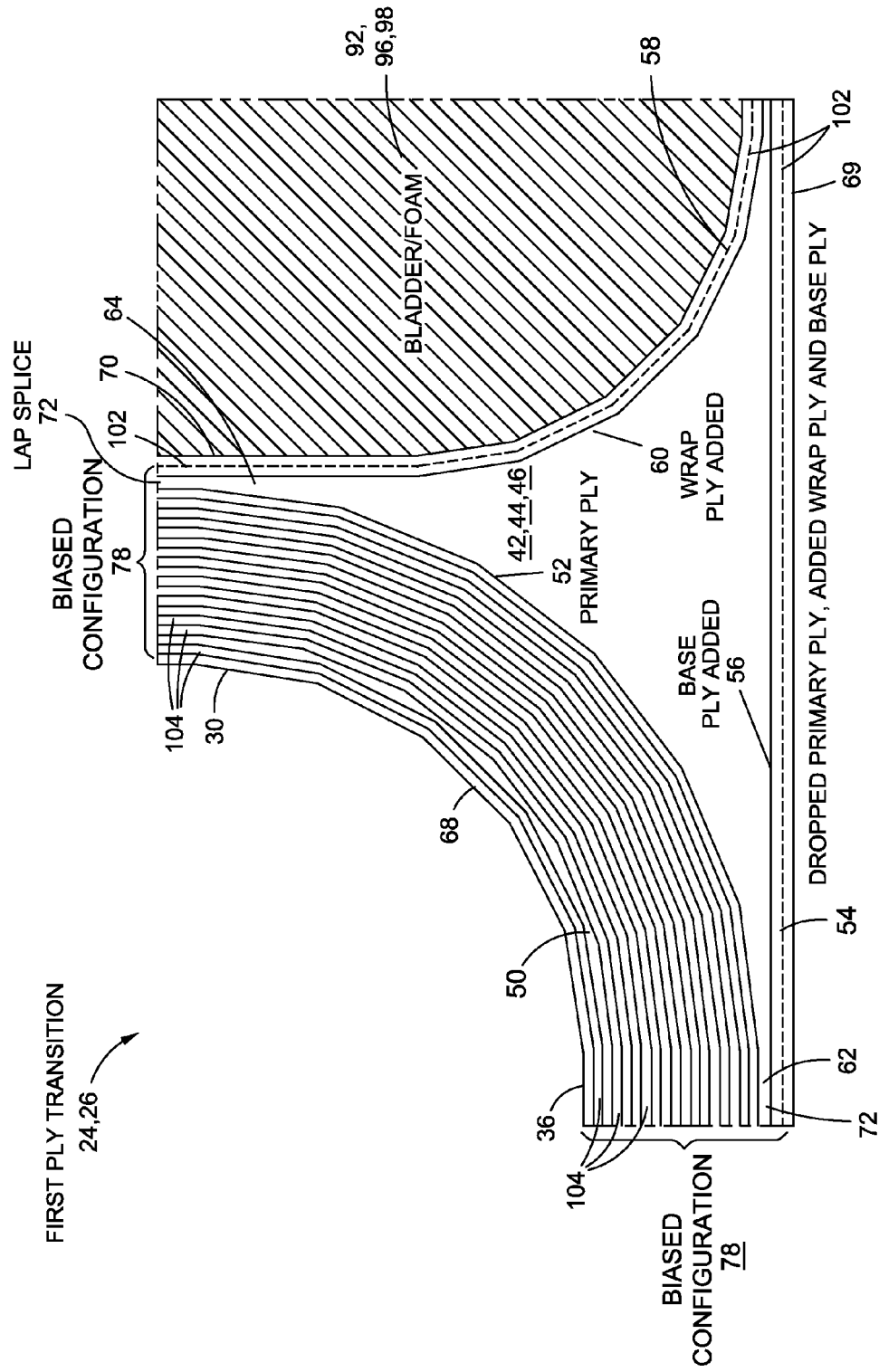

FIG. 19 illustrates the initial ply transition wherein the fabric ply 102 for the primary laminate 50 illustrated in FIG. 18 has been dropped. Simultaneously, a wrap ply 60 has been added to the wrap laminate 58 and to the base laminate 54. In this regard, the overall thickness $t_{flange}$ of the first flange 36 which is comprised of the base laminate 54 and primary laminate 50 remains constant as does the overall thickness $t_{web}$ of the first web 30. A lap splice 72 is formed at the primary-wrap interface 64 Likewise, a lap splice 72 is formed at the base-primary interface 62 and at the wrap-base interface 66. FIG. 19 illustrates that the primary-wrap interface 64 comprises a lap splice 72 formed of tape plies 104. However, as was indicated above, plies having any fiber orientation may be used. Furthermore, it is also contemplated that in each ply transition and at each interface, the lap splices 72 that occur within the ply transition zone 76 may comprise lap splices 72 of tape plies 104 having differing fiber orientations.

Figure 20:
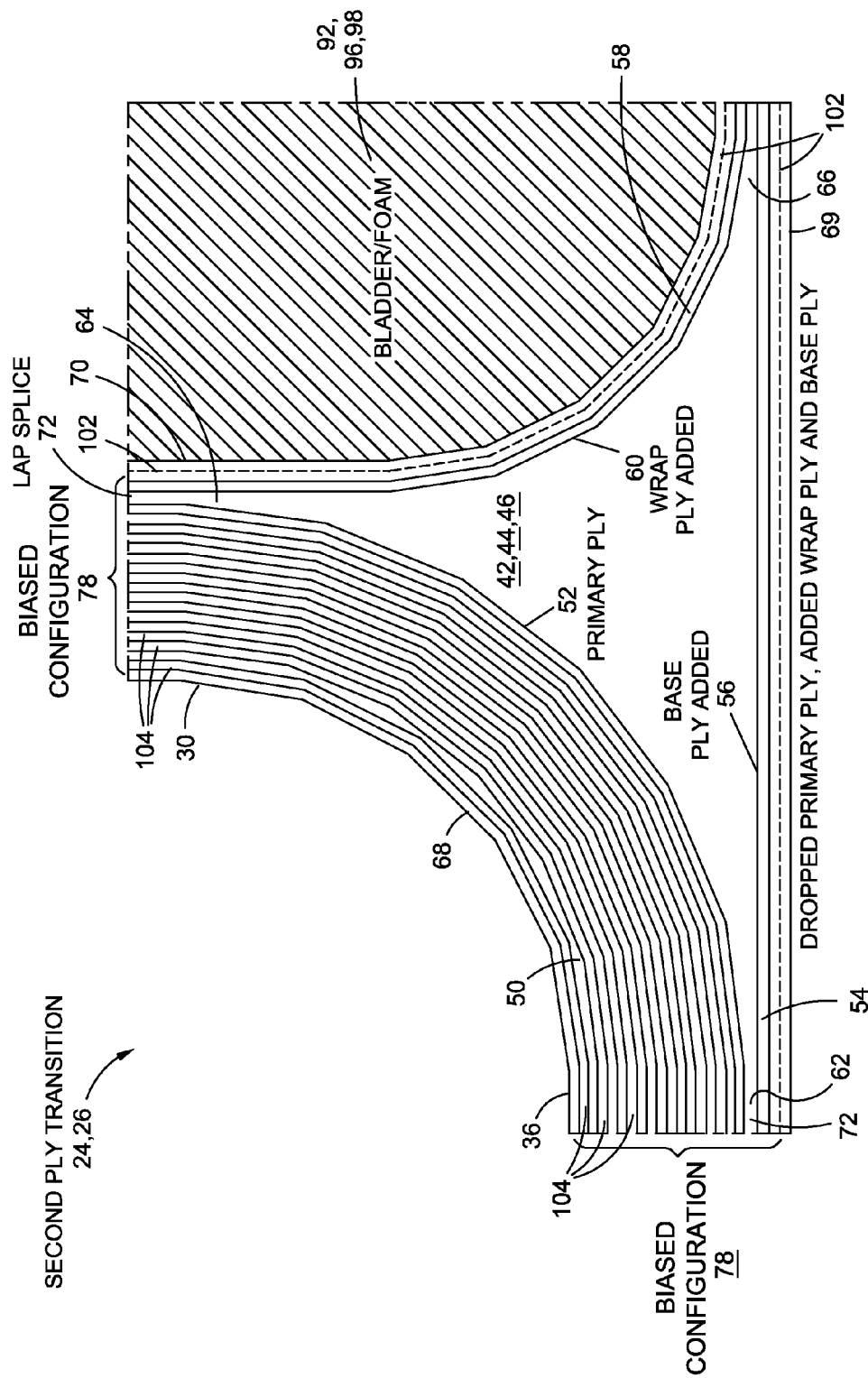

Referring to FIG. 20, shown is a second ply transition wherein one of the primary plies 52 is dropped and a wrap ply 60 is added to the wrap laminate 58 while a base ply 56 is added to the base laminate 54. As can be seen in FIG. 20, the ply transition zone 76 may be configured such that a combined thickness of the base laminate 54 and primary laminate 50 is maintained as is the combined thickness of the wrap laminate 58 and primary laminate 50. However, the combined thickness of the wrap laminate 58 and the base laminate 54 which form the base center 40 increases in thickness by two plies. FIG. 21 illustrates a third ply transition wherein a primary ply 52 is dropped from the primary laminate 50 while a wrap ply 60 and a base ply 56 are added to the wrap laminate 58 and base laminate 54, respectively, resulting in an increase in the thickness $t_{base\ center}$ of the base center 40 and maintaining a thickness $t_{flange}$ of the first flange 36 and thickness $t_{web}$ of the first web 30. FIG. 22 illustrates a second to last transition of plies of the ply transition zone 76 wherein a primary ply 52 is dropped and a wrap ply 60 is added to the wrap laminate 58 and a base ply 56 is added to the base laminate 54. In an embodiment, as illustrated, the stringer 26 may comprise a fabric ply 102 extending along the mandrel 92 such that the fabric ply 102 forms the vent surface 70 of the stringer 26.

Referring to FIG. 23, shown is a last ply transition step within the ply transition zone 76 wherein fabric plies 102 are added along the first noodle 44. As can be seen, the ply layup 48 of the stringer 26 at the second ply zone end 108 provides an unbiased configuration 80 at the base-primary interface 62 as well as at the primary-wrap interface 64. The wrap-base interface 66 transitions from a first laminate thickness 136 as shown in FIG. 18 to a second laminate thickness 138 at the second ply zone end 108 as shown in FIG. 23. As was indicated above, FIG. 23 illustrates an arrangement of plies including, namely, tape plies 104 and fabric plies 102. However any arrangement of ply layups may be provided and is not limited to that which is illustrated in the Figures. For example, fabric plies 102 and tape plies 104 may be positioned at any location within each of the ply layups of the wrap laminate 58, base laminate 54 and primary laminate 50. Other ply materials may also be used in the ply layup 48.

Figure 25:
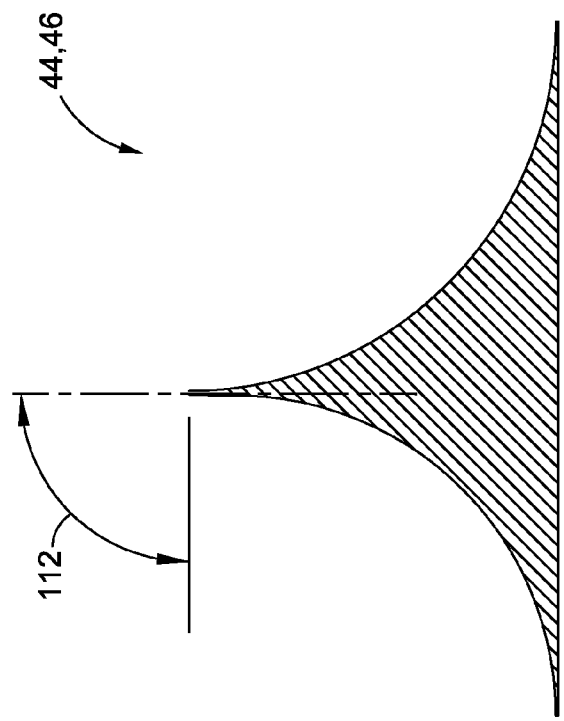
FIG. 25 is a sectional illustration of the second noodle at a location of the second angle zone end wherein the web is oriented at the second angle relative to the base portion.
Figure 24:
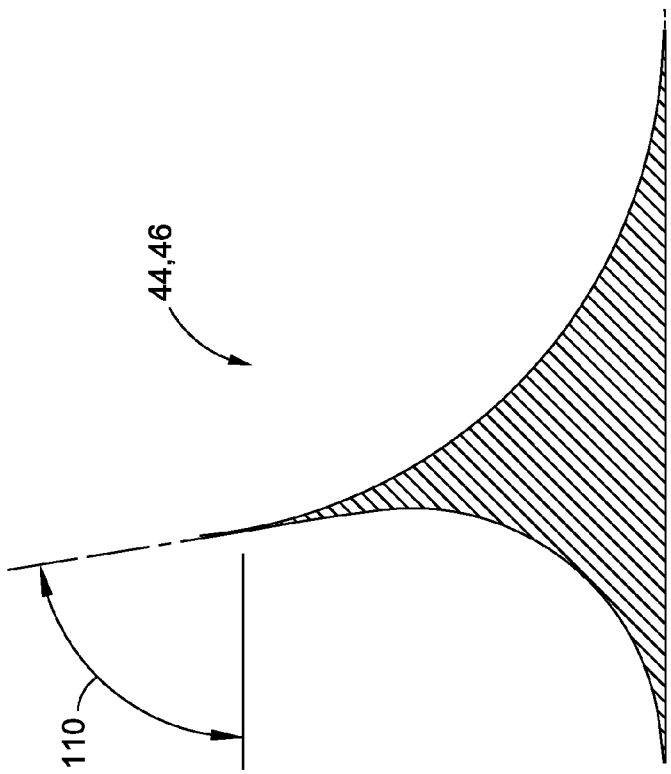
FIG. 24 is a sectional illustration of the second noodle at a location of the first angle zone end wherein the web is oriented at the first angle relative to the base portion.

Referring to FIGS. 24-25, shown is the first noodle 44 or radius filler 42 illustrating a transition thereof within the angle transition zone 74 in correspondence with the angle transition zone 74 of the stringer 26 illustrated in FIGS. 5, 6, 9A and 9D. As can be seen in FIG. 24, the first noodle 44 transitions from the first angle 110 at the first angle zone end 114 shown in FIG. 9B to the second angle 112 as shown in FIG. 25 at the second angle zone end 116 as shown in FIG. 9C. The second noodle 46 may include a similar transition to the first noodle 44 but in minor image. The first and second noodles 44, 46 may be specifically shaped or preformed to correspond to the changing orientation of the first and second angles 110, 112 within the angle transition zone 74. The first and second noodles 44, 46 may be formed by any suitable means known in the art and may include the use of woven fabric as material for the first and second noodles 44, 46 and forming or cutting as required to fill the radius defined between the primary laminate 50, base laminate 54 and wrap laminate 58.

Figure 26:
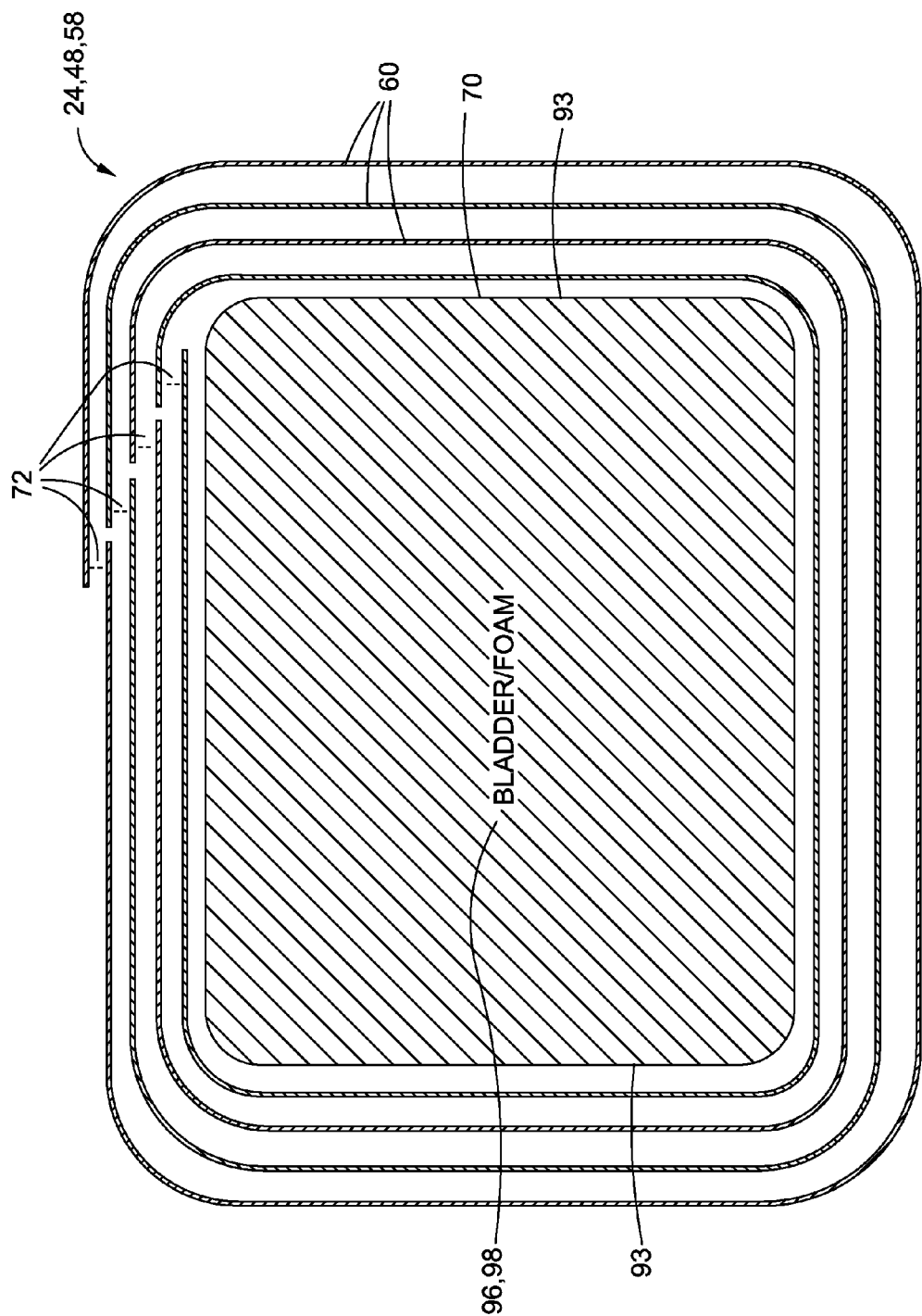
FIG. 26 is a sectional illustration of the wrap laminate taken along line 26-26 of FIG. 4 and illustrating lap splices of a portion of the wrap plies that make up the wrap laminate.

Referring briefly to FIG. 26, shown is a cross-sectional illustration of the ply layup 48 of wrap plies 60 that form the wrap laminate 58. As was earlier mentioned, the wrap laminate 58 may be formed by laying up the wrap plies 60 about a suitable mandrel 92. For example, FIG. 11 illustrates the incremental increase in the quantity of wrap plies 60 which are formed about the mandrel 92 within the ply transition zone 76 and are preferably arranged in correspondence with the incremental decrease in the primary plies 52 and the incremental increase in the base plies 56. In an embodiment illustrated in FIG. 26, the axially oriented lap splices 72 of the wrap plies 60 are preferably positioned to fall within the cap 34 of the stringer 26. However, it is contemplated that the lap splices 72 may be positioned to fall within the first and second flanges 36, 38, within the base center 40 or any combination thereof. Furthermore, the extent of overlap of the lap splices 72 as shown in FIG. 26 may be in proportion to the total number of wrap plies 60 that are added within the ply transition zone 76. In this regard, the spacing between the lap splices 72 as shown in FIG. 26 is preferably evenly distributed across a width of the cap 34 which may be defined as the distance between the first and second webs 30, 32 of the stringer 26. The spacing between the lap splices 72 may be linear or may be non-linear and may vary at any portion across a width of the cap 34. Furthermore, the spacing between the lap splices 72 may be uniformly distributed along any one of the first 30 and second webs 32 or along the base center 40 or along any combination thereof.

Figure 27:
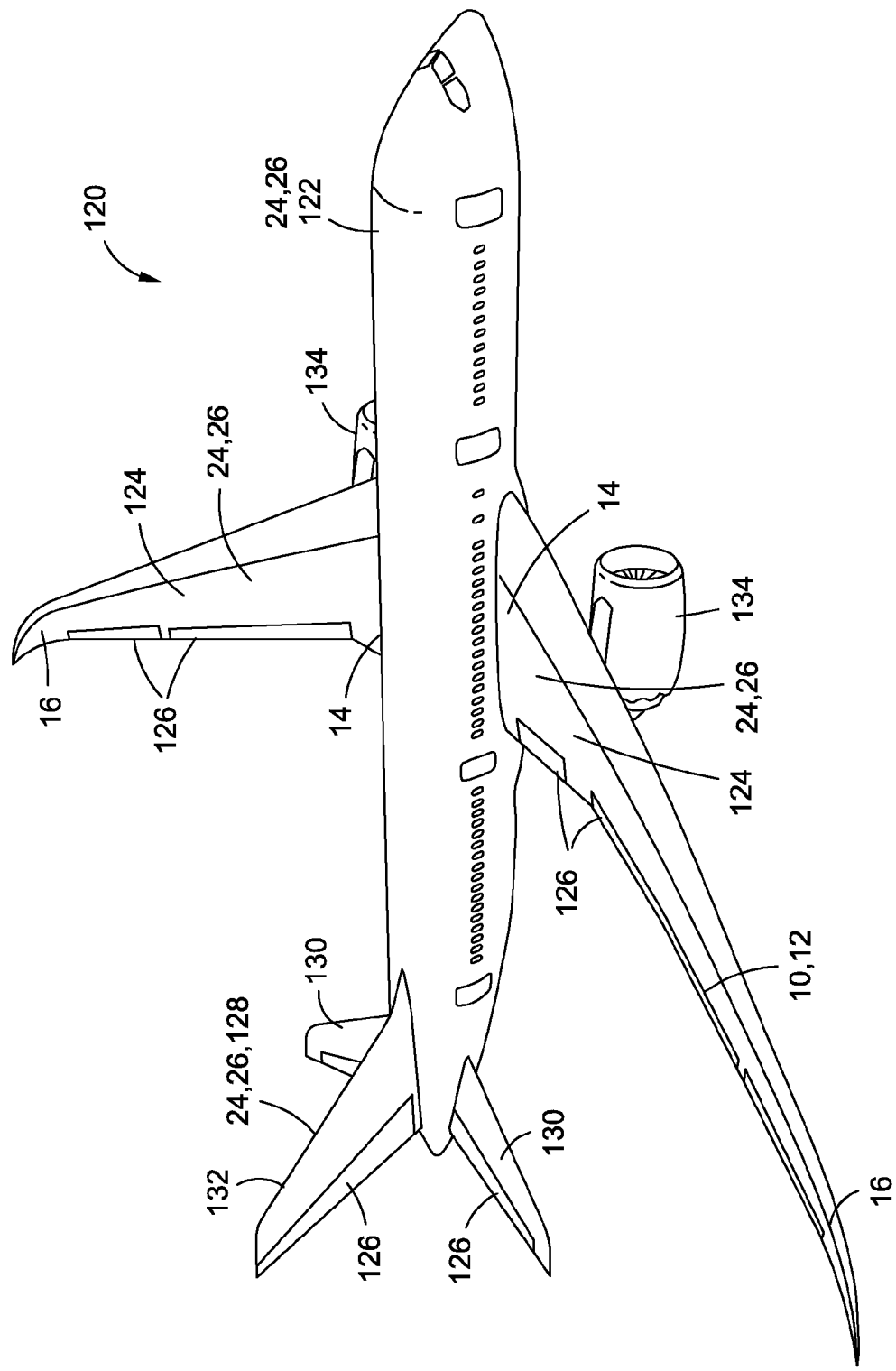
FIG. 27 is a perspective illustration of an aircraft which may incorporate one or more stringers in a composite structure of the aircraft.

Referring to FIG. 27, shown is a perspective illustration of an aircraft 120 which may incorporate one or more of the stringers 26 as disclosed herein. As can be seen in FIG. 27, the aircraft 120 may comprise a fuselage 122 having a pair of wings 124 and having a tail section 128 which may include a vertical stabilizer 132 and horizontal stabilizers 130 and which may further include control surfaces 126 and propulsion units 134. The aircraft 120 as shown in FIG. 27 is generally representative of a variety of vehicles which may incorporate the stringer 26 as described herein. In this regard, the stringer 26 may be incorporated into any system, subsystem, assembly, application, structure 10 or vehicle including any marine, land, air and/or space vehicle.

In an embodiment, the aircraft 120 as shown in FIG. 27 may incorporate stringers 26 in the fuselage 122 section and/or in the wing 124 section wherein the stringers 26 may be coupled to skin members 12 in order to form upper and lower surfaces of the wings 124. As was earlier indicated, such stringers 26 may provide dual functionality in venting fuel vapors from an inboard 14 section of the wing 124 to an outboard section thereof in addition to a primary load carrying capability of the stringers 26. In this regard, the present disclosure provides a composite aircraft 120 structure 10 which may comprise a skin member 12 having a stringer 26 mounted thereto and which transitions to a hat section 84 as illustrated in FIGS. 5-7 to a dual-blade section 86 as illustrated in FIG. 8. As was earlier mentioned, the dual-blade section 86 may be formed by removing at least a portion of the cap 34 along the length of a stringer 26. The cap 34 may preferably be removed at any location outside of the ply transition zone 76 and the angle transition zone 74. However, it is contemplated that removal of the cap 34 may be at any position and may occur within the ply transition zone 76 and/or within the angle transition zone 74.

Figure 28:
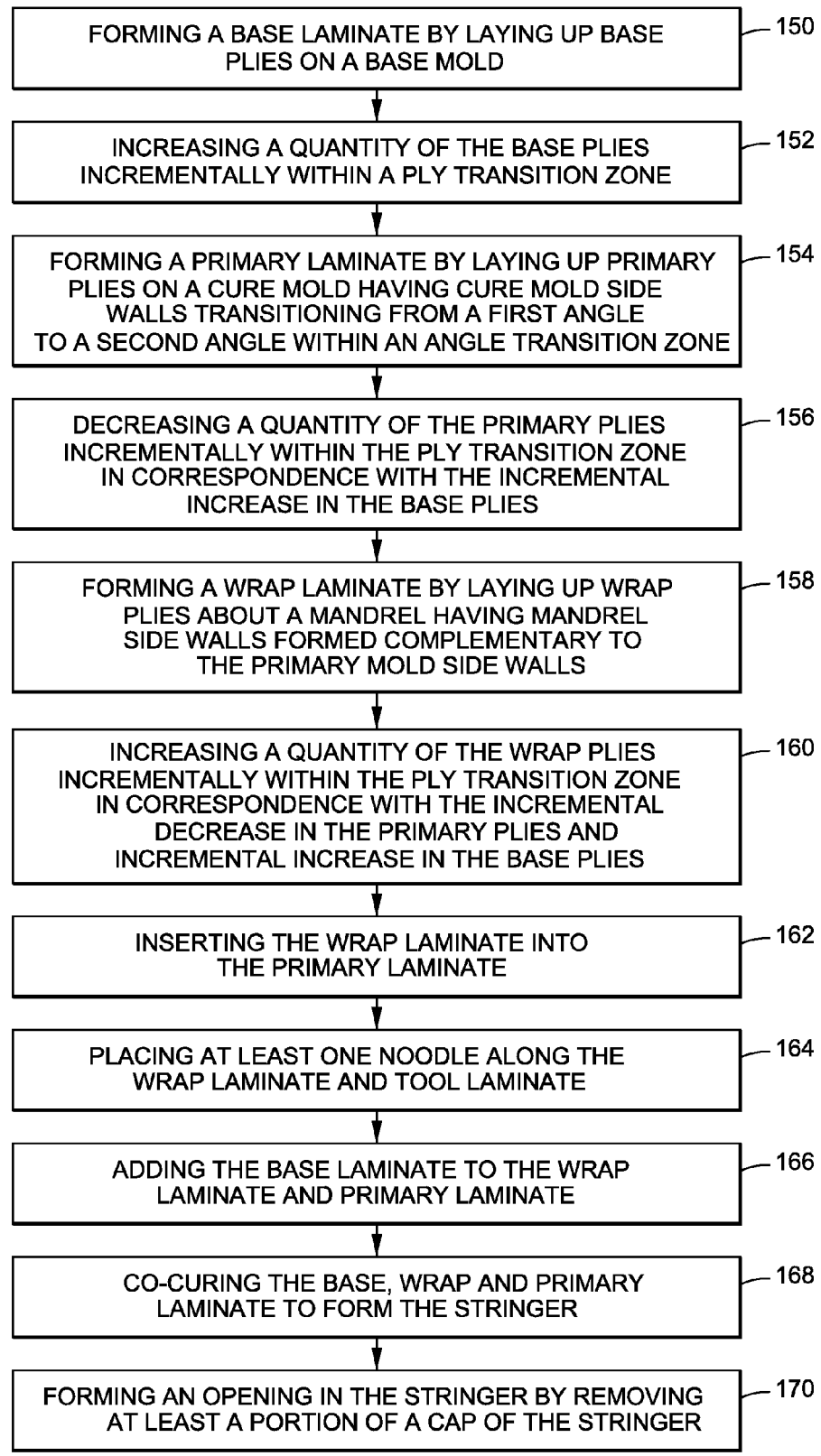
FIG. 28 is a methodology of forming a stringer transitioning from a hat section to a dual-blade section.

Referring now to FIG. 28, shown is a methodology of forming the stringer 26 having the base portion 28 and the pair of first and second webs 30, 32 which extend outwardly therefrom as illustrated in FIGS. 1-8. In an embodiment, the methodology for forming the stringer 26 may comprise initially forming the base laminate 54 which may include laying up the base plies 56 on the base mold 90 in step 150 as illustrated in FIG. 12. Formation of the base laminate 54 may include incorporation of the ply transition zone 76 wherein the ply layup 48 of the base plies 56 that comprise the base portion 28 are altered as described above with reference to FIGS. 12-23. More specifically, the methodology may comprise step 152 including increasing the quantity of the base plies 56 incrementally within the ply transition zone 76 such that the thickness of the base laminate 54 increases from the first ply zone end 106 to the second ply zone end 108 as best seen in FIG. 12.

Step 154 may comprise forming the primary laminate 50 by laying up the primary plies 52 on the cure mold 100 as best seen in FIG. 10. The primary laminate 50 may comprise at least a portion of the first and second flanges 36, 38 and first and second webs 30, 32 which may be interconnected by the cap 34. The cure mold 100 may include cure mold side walls 101 which transition from the first angle 110 at the first angle zone end 114 to the second angle 112 at the second angle zone end 116 where the first and second angles 110, 112 are defined relative to the base portion 28 as best seen in FIGS. 5-6. In this regard, the cure mold 100 may incorporate a changing angle of the cure mold side walls 101 similar to that which is illustrated in FIG. 9A to 9D. Regarding the ply layup 48 of the primary laminate 50, step 156 may comprise decreasing the quantity of the primary plies 52 incrementally within the ply transition zone 76. As was earlier mentioned, the incremental decrease or drop in the quantity of primary plies 52 that are laid up on the cure mold 100 is preferably in correspondence with the incremental increase in the quantity of base plies 56 that are laid out in step 152.

Referring to FIG. 11, step 158 may comprise forming the wrap laminate 58 by laying up the wrap plies 60 about a suitable mandrel 92 such as a foam 98 mandrel or an inflatable bladder 96 or other suitable mandrel configuration. As best seen in FIG. 11, the mandrel 92 includes mandrel side walls 93 that are formed complementary to the cure mold side walls 101. More specifically, the cure mold side walls 101 transition from the first angle 110 to the second angle 112 within the angle transition zone 74 Likewise, the mandrel side walls 93 transition from the first angle 110 to the second angle 112 in correspondence with the transition of the cure mold side walls 101. For example, as described above with reference to FIGS. 9A and 9D, in an embodiment, the transition from the first angle 110 to the second angle 112 may occur at a varying transition rate. However, a variety of alternative transition rates may be incorporated into the angle transition zone 74 such that the methodology is not limited to that which is illustrated and disclosed in FIGS. 9A-9D.

Regarding the transition of plies in the wrap laminate 58 shown in FIG. 11, step 160 may comprise incrementally increasing the quantity of wrap plies 60 within the ply transition zone 76. The incremental increase in the wrap plies 60 is preferably in correspondence with the incremental decrease or drop in the primary plies 52 and the incremental increase in the base plies 56. For example, as shown in FIG. 4, the angle transition zones 76 incorporated into each one of the base laminate 54, wrap laminate 58 and primary laminate 50 are preferably registered or aligned with one another such that assembly of the wrap laminate 58 into the primary laminate 50 results in registration of the lap splices 72 relative to one another Likewise, assembly of the base laminate 54 to the combination of the wrap laminate 58 and primary laminate 50 also preferably results in registration of the lap splices 72. In this regard, step 162 comprises assembling the stringer 26 by inserting the wrap laminate 58 into the primary laminate 50. For example, in an embodiment, formation of the stringer 26 may comprise installing the wrap laminate 58 as illustrated in FIG. 11 into the primary laminate 50 positioned on the cure mold 100 as shown in FIG. 10. The mandrel 92 may also be installed in the wrap laminate 58 during step 162.

Step 164 may comprise placing at least one of the first and second noodles 44, 46 as shown in FIGS. 24 and 25 along the wrap laminate 58 and primary laminate 50 such that the cross-sectional configuration of the first and second noodles 44, 46 corresponds to the wrap laminate 58 and primary laminate 50 along the length of the stringer 26. More specifically, the first and second noodles 44, 46 are preferably provided with a cross-sectional configuration that includes the first angle 110 at the first angle zone end 114 and the second angle 112 at the second angle zone end 116. As was earlier indicated, the first and second noodles 44, 46 may be formed by any suitable means including pultrusion, extrusion, hand layup or any other suitable forming process.

Step 166 in the methodology of forming the stringer 26 may comprise adding the base laminate 54 to the wrap laminate 58 and primary laminate 50 after installation of the first and second noodles 44, 46. As was earlier indicated, the ply transition zone 76 in the base laminate 54 is preferably positioned in correspondence to the ply transition zones 76 of the base laminate 54 and wrap laminate 58 such that the lap splices 72 are in registration with one another. Following assembly, the base laminate 54, wrap laminate 58 and primary laminate 50 may be integrated into a unitary structure 10 by co-curing in step 168 through the application of a predetermined amount of pressure and/or heat for a predetermined period of time using any suitable curing or bonding process.

Step 170 may comprise forming the opening 88 in the stringer 26 between the first and second flanges 36, 38 by removing at least a portion of the cap 34. For example, as shown in FIG. 3, the cap 34 may be removed at a location that is outside the ply transition zone 76 and the angle transition zone 74 although the cap 34 may be removed at any location along the stringer 26. The opening 88 may provide a means for reducing the stiffness of the stringer 26 and for venting the stringer 26.

Figure 29:
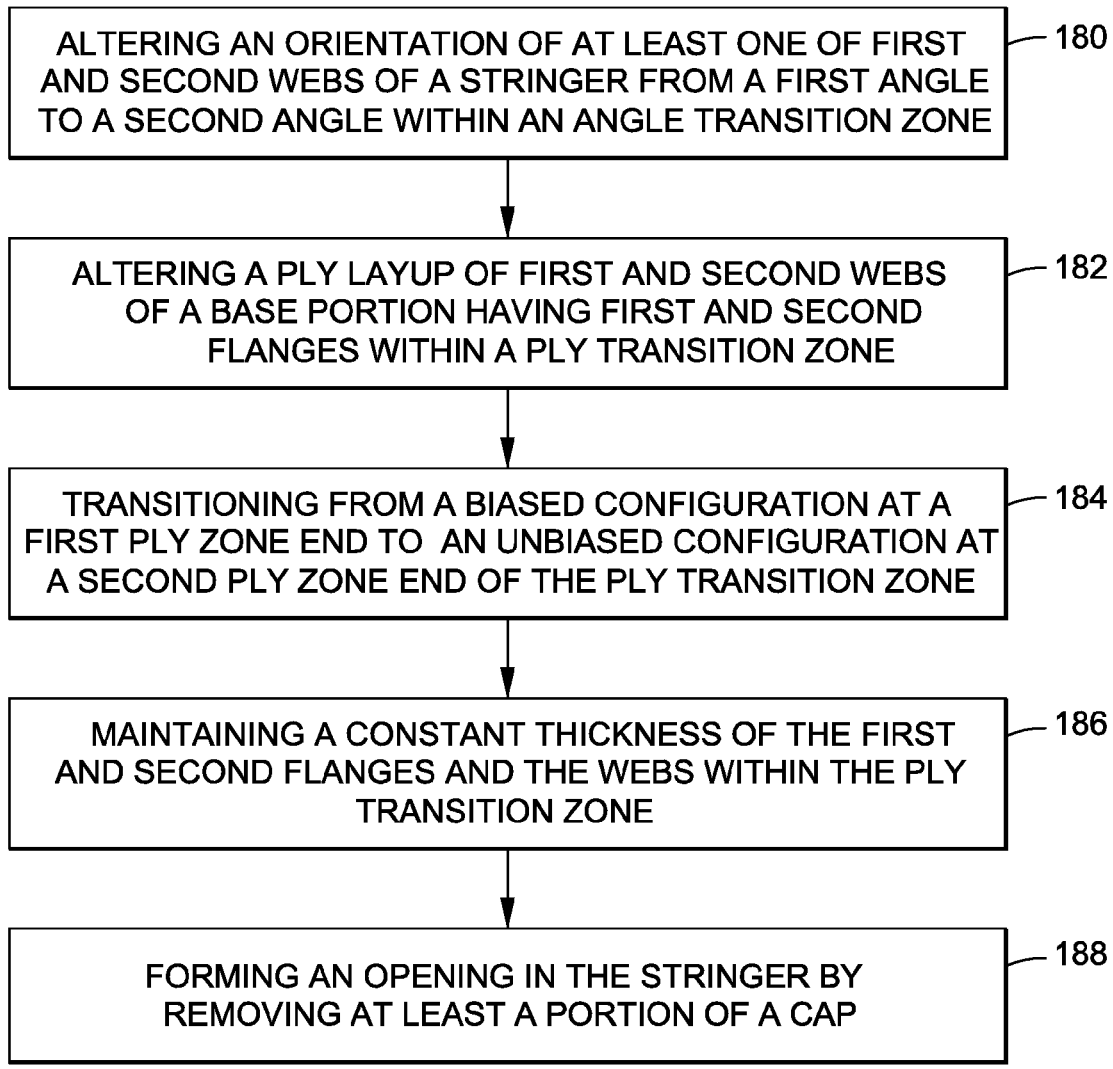
FIG. 29 is a methodology of transitioning the stringer by altering the orientation of at least one of the first and second webs within the angle transition zone and/or altering the ply layup within the ply transition zone.

With reference now to FIG. 29, the present disclosure also includes a methodology for transitioning the stringer 26 from a hat section 84 to a dual-blade section 86. As was earlier indicated, the stringer 26 may comprise the base portion 28 including the first and second flanges 36, 38 interconnected by the base center 40 as best seen in FIGS. 5-8. The stringer 26 may further comprise the first and second webs 30, 32 which may extend outwardly from the base portion 28 and which may be interconnected by the cap 34 which may extend at least partially along a length of a stringer 26.

Step 180 of the methodology comprises altering the orientation of at least one of the webs of the stringer 26 from the first angle 110 to the second angle 112 within the angle transition zone 74. For example, as illustrated in FIGS. 5-6, at least one of the first and second webs 30, 32 may be oriented at the first angle 110 which may be a nominal or non-perpendicular angle relative to the base portion 28. At the second angle zone end 116, at least one of the first and second webs 30, 32 may be transitioned to the second angle 112 which may comprise a substantially perpendicular orientation thereof relative to the base portion 28 although the second angle 112 which may comprise a non-perpendicular orientation. The transition rate with which the first and second webs 30, 32 transition from the first angle 110 to the second angle 112 along the angle transition zone 74 may be linear or non-linear. For example, as illustrated in FIGS. 9A to 9D and as described above, the angle transition may comprise an initially mild transition rate with an increasingly aggressive transition rate towards a center of the angle transition zone 74. The transition rate may then reduce from the center of the angle transition zone 74 to the second angle zone end 116.

Step 182 may comprise altering the ply layup 48 of at least one of the first and second webs 30, 32 of the stringer 26. In addition, step 182 may comprise altering the ply layup 48 of the base portion 28 including the first and second flanges 36, 38. The alteration of the ply layups may occur within the ply transition zone 76 as best seen in FIGS. 10-23 and which illustrate the incremental decrease in the quantity of primary plies 52 and the corresponding incremental increase in the quantity of wrap plies 60 and base plies 56. More specifically, the methodology may comprise dropping a primary ply 52 when adding a wrap ply 60 and a base ply 56. In an embodiment, the dropping of primary plies 52 and adding of wrap plies 60 and base plies 56 may occur in any suitable increment such as, without limitation, increments of approximately 0.01 inch to approximately 2 inches or more. The step of altering the ply layup 48 of the base portion 28 and the first and second webs 30, 32 within the ply transition zone 76 may comprise transitioning from the biased configuration 78 at the first ply zone end 106 to the unbiased configuration 80 at the second ply zone end 108 as shown in FIGS. 13A-23 and as described above. However, the stringer 26 may be configured such that the biased configuration 78 is provided at the first and second ply zone ends 106, 108.

Step 186 of the methodology of forming the stringer 26 may further comprise maintaining an essentially constant thickness $t_{flange}$ of at least one of the first and second flanges 36, 38, and at least one of the first and second webs 30, 32 as well as the thickness of the cap $t_{cap}$ within the ply transition zone 76. For example, as shown in FIGS. 18-23, the total quantity of plies in the primary laminate 50 and base laminate 54 that make up the first flange 36 and the total quantity of plies in the primary laminate 50 and wrap laminate 58 that make up the first web 30 may be maintained in equal number within the ply transition zone 76. However, it should be noted that the quantity of plies 52, 56, 60 may be increased or decreased within the ply transition zone 76. Furthermore, the lap splices 72 may result in an increase in thickness by one ply within the ply transition zone 76.

Step 188 of the method of forming the stringer 26 may comprise forming the opening 88 in the stringer 26 by removing at least a portion of the cap 34 of the stringer 26 as best seen in FIGS. 2 and 3. More specifically, FIG. 2 illustrates a removal of at least a portion of the cap 34 in order to form the opening 88 in the stringer 26. As indicated above, the opening 88 may provide a means for venting the stringer 26 and for reducing the stiffness of the stringer 26. In addition, removal of the cap 34 may facilitate a reduction in the overall mass or weight of the stringer 26.

Figure 30:
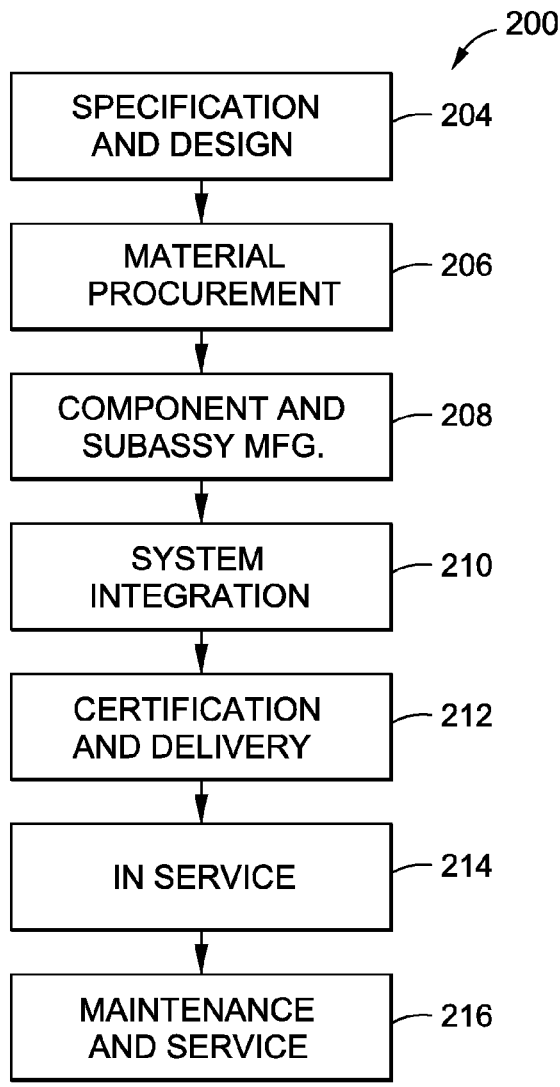
FIG. 30 is a flow diagram of an aircraft production and service methodology.
Figure 31:
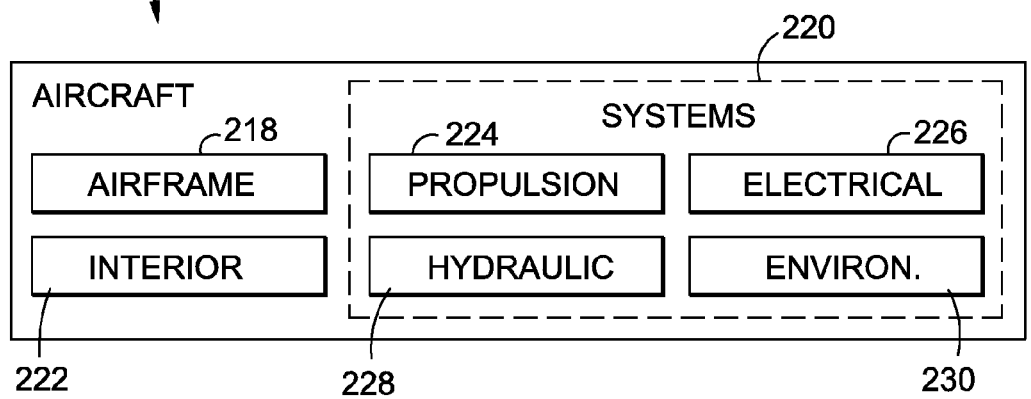
FIG. 31 is a block diagram of an aircraft.

Referring to FIGS. 30-31, embodiments of the disclosure may be described in the context of an aircraft manufacturing and service method 200 as shown in FIG. 30 and an aircraft 202 as shown in FIG. 31. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosed embodiments may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A stringer, comprising:
a base laminate formed of base plies and having a generally planar shape;
a primary laminate formed of primary plies and having a generally hat-shaped cross-section along at least a portion of a length thereof;
a wrap laminate formed of wrap plies and having a closed cross-sectional shape along at least a portion of a length thereof, the wrap laminate being nested within the primary laminate;
the primary laminate being flush against the base laminate to form a base portion including first and second flanges; and
the primary laminate and the wrap laminate forming a first web and a second web extending outwardly from the base portion, the orientation of at least one of the first and second webs transitioning from a first angle to a second angle within an angle transition zone.

2. The stringer of claim 1 further comprising:
a cap interconnecting the first and second webs.

3. The stringer of claim 1 further comprising:
a base center interconnecting the first and second flanges and comprising the wrap laminate and the base laminate.

4. The stringer of claim 1 wherein:
at least one of the first and second angles comprises a non-perpendicular orientation of at least one of the first and second webs relative to the base portion.

5. The stringer of claim 1 further comprising:
an opening formed between the first and second webs.

6. The stringer of claim 1 wherein:
at least one of the first and second webs and at least one of the first and second flanges has a constant thickness along a length of the ply transition zone.

7. The stringer of claim 1 wherein:
a ply layup of the base portion and the first and second webs transitions within a ply transition zone;
the ply transition zone including an increasing or decreasing quantity of plies.

8. The stringer of claim 7 wherein:
the ply transition zone has opposing first and second ply zone ends;
the ply layup of the base portion and the first and second webs transitioning from a biased configuration at the first ply zone end to an unbiased configuration at the second ply zone end.

9. The stringer of claim 7 wherein:
the angle transition zone and the ply transition zone are in series relative to one another.

10. The stringer of claim 7 wherein:
the angle transition zone and the ply transition zone at least partially overlap one another.

11. A composite aircraft structure, comprising:
a skin member; and
a stringer mounted to the skin member, the stringer transitioning from a hat section to a dual-blade section and including:
a base laminate formed of base plies and having a generally planar shape;
a primary laminate formed of primary plies and having a generally hat-shaped cross-section along at least a portion of a length thereof;
a wrap laminate formed of wrap plies and having a closed cross-sectional shape along at least a portion of a length thereof, the wrap laminate being nested within the primary laminate;
the primary laminate being flush against the base laminate to form a base portion including first and second flanges; and
the primary laminate and the wrap laminate forming a first web and a second web extending outwardly from the base portion, the orientation of the first and second webs relative to the base portion transitioning within an angle transition zone having opposing first and second angle zone ends, at least one of the first and second webs defining a non-perpendicular orientation at the first angle zone end.

12. The composite aircraft structure of claim 11 wherein:
a ply layup of the base portion and the first and second webs transitions within a ply transition zone having opposing first and second ply zone ends, the ply layup of the base portion and the webs forming a biased configuration at the first ply zone end and an unbiased configuration at the second ply zone end;
the angle transition zone and ply transition zone being located in series relative to one another.

13. The composite aircraft structure of claim 11 wherein:
the second angle comprises a substantially perpendicular orientation of at least one of the first and second webs relative to the base portion.

14. The composite aircraft structure of claim 11 further comprising:
a cap interconnecting the first and second webs.

15. The composite aircraft structure of claim 11 further comprising:
an opening formed between the first and second webs.

16. The composite aircraft structure of claim 11 wherein:
the stringer and skin member comprise a portion of at least one of the following: a fuselage, a wing, a tail section.

17. A method of forming a stringer having a base portion and a pair of first and second webs extending outwardly therefrom, the method comprising the steps of:
- forming a base laminate into a generally planar shape by laying up base plies on a base mold;
- increasing the quantity of the base plies incrementally within a ply transition zone;
- forming a primary laminate into a generally hat-shaped cross-section by laying up primary plies on a cure mold having cure mold side walls transitioning from a first angle to a second angle within an angle transition zone;
- decreasing the quantity of primary plies incrementally within the ply transition zone in correspondence with the incremental increase in base plies;
- forming a wrap laminate into a closed cross-sectional shape by laying up wrap plies about a mandrel formed complementary to the cure mold;
- increasing the quantity of wrap plies incrementally within the ply transition zone in correspondence with the incremental decrease in primary plies and incremental increase in base plies;
- inserting the wrap laminate into the primary laminate;
- placing at least one of a first and second noodle along the wrap laminate and primary laminate;
- adding the base laminate to the wrap laminate and primary laminate such that the primary laminate is flush against the base laminate to form a base portion including first and second webs extending outwardly from the base portion, the orientation of at least one of the first and second webs transitioning from a first angle to a second angle within an angle transition zone; and
- co-curing the base laminate, wrap laminate and primary laminate to form the stringer.

\* \* \* \* \*